United States Patent
Dillaway et al.

(10) Patent No.: US 8,201,215 B2
(45) Date of Patent: Jun. 12, 2012

(54) CONTROLLING THE DELEGATION OF RIGHTS

(75) Inventors: Blair B. Dillaway, Redmond, WA (US); Moritz Y. Becker, Cambridge (GB); Andrew D. Gordon, Cambridge (GB); Cedric Fournet, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 872 days.

(21) Appl. No.: 11/530,446

(22) Filed: Sep. 8, 2006

(65) Prior Publication Data

US 2008/0066159 A1 Mar. 13, 2008

(51) Int. Cl.
*G06F 17/30* (2006.01)
*H04L 29/06* (2006.01)

(52) U.S. Cl. ......... 726/2; 726/4; 726/9; 726/20; 726/26; 713/182

(58) Field of Classification Search ........................ 726/4
See application file for complete search history.

(56) References Cited

U.S. PATENT DOCUMENTS

| | | | | |
|---|---|---|---|---|
| 4,868,877 | A * | 9/1989 | Fischer | 713/157 |
| 5,214,702 | A * | 5/1993 | Fischer | 380/30 |
| 5,649,099 | A * | 7/1997 | Theimer et al. | 726/4 |
| 5,765,153 | A | 6/1998 | Benantar et al. | |
| 6,189,103 | B1 | 2/2001 | Nevarez et al. | |
| 6,216,231 | B1 * | 4/2001 | Stubblebine | 726/10 |
| 6,256,734 | B1 | 7/2001 | Blaze et al. | |
| 6,256,741 | B1 * | 7/2001 | Stubblebine | 726/10 |
| 6,367,009 | B1 * | 4/2002 | Davis et al. | 713/166 |
| 6,484,261 | B1 | 11/2002 | Wiegel | |
| 6,779,120 | B1 | 8/2004 | Valente et al. | |
| 6,895,503 | B2 * | 5/2005 | Tadayon et al. | 713/168 |
| 6,931,530 | B2 | 8/2005 | Pham et al. | |
| 6,976,009 | B2 * | 12/2005 | Tadayon et al. | 705/51 |
| 7,085,741 | B2 * | 8/2006 | Lao et al. | 705/51 |
| 7,127,605 | B1 * | 10/2006 | Montgomery et al. | 713/150 |
| 7,162,633 | B2 * | 1/2007 | Wang et al. | 713/168 |
| 7,260,715 | B1 | 8/2007 | Pasieka | |
| 7,290,138 | B2 | 10/2007 | Freeman et al. | |
| 7,426,635 | B1 | 9/2008 | Parkhill et al. | |
| 7,437,421 | B2 * | 10/2008 | Bhogal et al. | 709/206 |
| 7,506,364 | B2 | 3/2009 | Vayman | |
| 7,509,489 | B2 | 3/2009 | Kostal et al. | |

(Continued)

FOREIGN PATENT DOCUMENTS

WO WO0056027 9/2000

(Continued)

OTHER PUBLICATIONS

"eXtensible rights Markup Language (XrML) 2.0 Specification," Part I-Part IV, ContentGuard, Nov. 20, 2001, 144 pages.*

(Continued)

*Primary Examiner* — Luu Pham
(74) *Attorney, Agent, or Firm* — Lee & Hayes, PLLC

(57) ABSTRACT

The delegation of rights may be controlled in a number of manners. In an example implementation, a delegation authority assertion is formulated with a delegator principle, a delegatee principal, a verb phrase, a resource, and a delagation-directive verb. In another example implementation, a delegation mechanism involving an assertor, a first principal, and a second principal enables a delegation to be specifically controlled. In yet another example implementation, a chained delegation mechanism enables explicit control of a permitted transitive chaining depth.

20 Claims, 11 Drawing Sheets

U.S. PATENT DOCUMENTS

| | | | |
|---|---|---|---|
| 7,512,782 B2* | 3/2009 | Kaler et al. | 713/155 |
| 7,533,265 B2 | 5/2009 | Ballinger et al. | |
| 7,543,140 B2* | 6/2009 | Dillaway et al. | 713/156 |
| 7,644,284 B1* | 1/2010 | Stubblebine | 713/178 |
| 7,823,192 B1 | 10/2010 | Fultz et al. | |
| 7,844,610 B2 | 11/2010 | Hillis et al. | |
| 2001/0018675 A1 | 8/2001 | Blaze et al. | |
| 2002/0087859 A1 | 7/2002 | Weeks et al. | |
| 2002/0109707 A1* | 8/2002 | Lao et al. | 345/700 |
| 2002/0184160 A1* | 12/2002 | Tadayon et al. | 705/57 |
| 2002/0184517 A1* | 12/2002 | Tadayon et al. | 713/200 |
| 2003/0083877 A1 | 5/2003 | Sugimoto | |
| 2003/0110192 A1 | 6/2003 | Valente et al. | |
| 2003/0115292 A1 | 6/2003 | Griffin et al. | |
| 2003/0120955 A1 | 6/2003 | Bartal et al. | |
| 2003/0149714 A1 | 8/2003 | Casati et al. | |
| 2003/0225697 A1 | 12/2003 | DeTreville | |
| 2003/0229781 A1 | 12/2003 | Fox et al. | |
| 2004/0024764 A1 | 2/2004 | Hsu et al. | |
| 2004/0034770 A1* | 2/2004 | Kaler et al. | 713/155 |
| 2004/0034774 A1* | 2/2004 | Le Saint | 713/169 |
| 2004/0064707 A1 | 4/2004 | McCann et al. | |
| 2004/0068757 A1* | 4/2004 | Heredia | 725/135 |
| 2004/0122958 A1 | 6/2004 | Wardrop | |
| 2004/0123154 A1 | 6/2004 | Lippman et al. | |
| 2004/0128393 A1 | 7/2004 | Blakley, III et al. | |
| 2004/0128546 A1 | 7/2004 | Blakley, III et al. | |
| 2004/0139352 A1 | 7/2004 | Shewchuk et al. | |
| 2004/0162985 A1 | 8/2004 | Freeman et al. | |
| 2004/0181665 A1 | 9/2004 | Houser | |
| 2004/0221174 A1 | 11/2004 | Le Saint et al. | |
| 2004/0243811 A1 | 12/2004 | Frisch et al. | |
| 2004/0243835 A1 | 12/2004 | Terzis et al. | |
| 2004/0250112 A1 | 12/2004 | Valente et al. | |
| 2005/0015586 A1 | 1/2005 | Brickell | |
| 2005/0033813 A1* | 2/2005 | Bhogal et al. | 709/206 |
| 2005/0055363 A1 | 3/2005 | Mather | |
| 2005/0066198 A1 | 3/2005 | Gelme et al. | |
| 2005/0071280 A1* | 3/2005 | Irwin et al. | 705/59 |
| 2005/0079866 A1 | 4/2005 | Chen et al. | |
| 2005/0080766 A1 | 4/2005 | Ghatare | |
| 2005/0097060 A1 | 5/2005 | Lee et al. | |
| 2005/0108176 A1 | 5/2005 | Jarol et al. | |
| 2005/0132220 A1 | 6/2005 | Chang et al. | |
| 2005/0138357 A1 | 6/2005 | Swenson et al. | |
| 2005/0187877 A1* | 8/2005 | Tadayon et al. | 705/51 |
| 2005/0188072 A1 | 8/2005 | Lee et al. | |
| 2005/0198326 A1 | 9/2005 | Schlimmer et al. | |
| 2005/0220304 A1 | 10/2005 | Lenoir et al. | |
| 2006/0005010 A1 | 1/2006 | Olsen et al. | |
| 2006/0005227 A1 | 1/2006 | Samuelsson et al. | |
| 2006/0015728 A1 | 1/2006 | Ballinger et al. | |
| 2006/0026667 A1 | 2/2006 | Bhide et al. | |
| 2006/0041421 A1 | 2/2006 | Ta et al. | |
| 2006/0041929 A1 | 2/2006 | Della-Libera et al. | |
| 2006/0048216 A1 | 3/2006 | Hinton et al. | |
| 2006/0075469 A1 | 4/2006 | Vayman | |
| 2006/0101521 A1* | 5/2006 | Rabinovitch | 726/26 |
| 2006/0106856 A1 | 5/2006 | Bermender et al. | |
| 2006/0129817 A1 | 6/2006 | Borneman et al. | |
| 2006/0136990 A1 | 6/2006 | Hinton et al. | |
| 2006/0156391 A1 | 7/2006 | Salowey | |
| 2006/0195690 A1 | 8/2006 | Kostal et al. | |
| 2006/0200664 A1 | 9/2006 | Whitehead et al. | |
| 2006/0206707 A1 | 9/2006 | Kostal et al. | |
| 2006/0206925 A1* | 9/2006 | Dillaway et al. | 726/5 |
| 2006/0206931 A1 | 9/2006 | Dillaway et al. | |
| 2006/0225055 A1 | 10/2006 | Tieu | |
| 2006/0230432 A1 | 10/2006 | Lee et al. | |
| 2006/0236382 A1 | 10/2006 | Hinton et al. | |
| 2006/0242075 A1* | 10/2006 | Ginter et al. | 705/54 |
| 2006/0242162 A1 | 10/2006 | Conner et al. | |
| 2006/0242688 A1 | 10/2006 | Paramasivam et al. | |
| 2006/0259776 A1 | 11/2006 | Johnson et al. | |
| 2007/0006284 A1 | 1/2007 | Adams et al. | |
| 2007/0043607 A1 | 2/2007 | Howard et al. | |
| 2007/0055887 A1 | 3/2007 | Cross et al. | |
| 2007/0056019 A1 | 3/2007 | Allen et al. | |
| 2007/0061872 A1 | 3/2007 | Carter | |
| 2007/0143835 A1 | 6/2007 | Cameron et al. | |
| 2007/0169172 A1 | 7/2007 | Backes et al. | |
| 2007/0199059 A1 | 8/2007 | Takehi | |
| 2007/0283411 A1 | 12/2007 | Paramasivam et al. | |
| 2007/0300285 A1 | 12/2007 | Fee et al. | |
| 2008/0066158 A1 | 3/2008 | Dillaway et al. | |
| 2008/0066159 A1 | 3/2008 | Dillaway et al. | |
| 2008/0066160 A1 | 3/2008 | Becker et al. | |
| 2008/0066169 A1 | 3/2008 | Dillaway et al. | |
| 2008/0066175 A1 | 3/2008 | Dillaway et al. | |
| 2008/0097748 A1 | 4/2008 | Haley et al. | |
| 2008/0127320 A1 | 5/2008 | De Lutiis et al. | |
| 2008/0172721 A1 | 7/2008 | Noh et al. | |
| 2009/0126022 A1* | 5/2009 | Sakaki | 726/25 |

FOREIGN PATENT DOCUMENTS

| | | |
|---|---|---|
| WO | WO2008030876 | 3/2008 |
| WO | WO2008031043 | 3/2008 |

OTHER PUBLICATIONS

Scott D. Stoller, "Trust Management a Tutorial," May 2006, Stony Brook University, pp. 19-20.*

Haidar et al., "An Extended RBAC Profile of XACML," ACM, Nov. 2006, pp. 13-20.*

Geuer-Pollmann et al., "Web Services and Web Service Security Standards," Information Security Technical Report, 2005, pp. 16-23.*

Bindings for the OASIS Security Assertion Markup Language (SAML) V2.0, OASIS Standard, Mar. 15, 2005.

"Security Assertion Markup Language (SAML) 2.0 Technical Overview", OASIS, Working Draft 01, Jul. 22, 2004, pp. 1-36.

Ardagna, et al., "XML-based Access Control Languages", Universita degli Studi di Milano, Italy, available at <<http://seclab.dti.unimi.it/Papers/RI-3.pdf>>, pp. 1-14.

Becker, et al., "Cassandra: Distributed Access Control Policies with Tunable Expressiveness", IEEE 5th International Workshop on Policies for Distributed Systems and Networks, 2004, pp. 159-168.

Becker, at al., "Cassandra: Flexible Trust Management, Applied to Electronic Health Records", IEEE Computer Security Foundations Workshop, 2004, pp. 139-154.

Blaze, et al., "Decentralized Trust Management", IEEE Symposium on Security and Privacy, 1996, pp. 164-173.

Blaze, et al., "The Role of Trust Management in Distributed Systems Security", Secure Internet Programming, 1999, pp. 185-210.

"eXtensible rights Markup Language (XrML) 2.0 Specificaton Part II: Core Schema", ContentGuard, available at <<www.xrml.org>> Nov. 20, 2001, 46 pages.

Damianou, et al., "Ponder: A Language for Specifying Security and Management Policies for Distributed Systems", Imperial College of Science, Technology and Medicine, London, U.K, Oct. 20, 2000, available at <<http://www.doc.ic.ac.uk/~ncd/policies/files/PonderSpec.pdf>>, pp. 1-49.

DeTreville, "Binder, A Logic-Based Security Language", IEEE Symposium on Security and Privacy, 2002, pp. 105-113.

Ellison, et al., "RFC 2693—SPKI Certificate Theory", available at <<http://www.ietf.org/rfc/rfc2693.txt, accessed on Sep. 27, 2006, 38 pages.

Halpern, et al., "Using First-Order Logic to Reason About Policies", IEEE Computer Security Foundations Workshop, 2003, available at <<http://arxiv.org/PS_cache/cs/pdf/0601/0601034.pdf>>, pp. 187-201.

Jim, "SD3: A Trust Management System with Certified Evaluation", Proceedings of the 2001 IEEE Symposium on Security and Privacy, 2001, available at <<http://www.research.att.com/~trevor/papers/JimOakland2001.pdf#search=%22%22SD3%3A%20A%20Trust%20Management%20System%20with%20Certified%20Evaluation%22%22>>, pp. 106-115.

Li, et al., "A Practically Implementable and Tractable Delegation Logic", IEEE Symposium on Security and Privacy, 2000, available at <<http://www.cs.purdue.edu/homes/ninghui/papers/dl_oakland00.pdf>>, pp. 27-42.

Li, et al., "Datalog with Constraints: A Foundation for Trust Management Languages", Proc. PADL, 2003, available at <<http://www.cs.purdue.edu/homes/ninghui/papers/cdatalog_padl03.pdf#search=%22%22Datalog%20with%20Constraints%3A%20A%20Foundation%20For%20Trust%20Management%20Languages%22%22>>, pp. 58-73.
Li, et al., "Design of a Role-Based Trust Management Framework", Proceedings of the 2002 IEEE Symposium on Security and Privacy, 2002, available at <<http://www.cs.purdue.edu/homes/ninghui/papers/rt_oakland02.pdf#search=%22%22Design%20of%20a%20Role-Based%20Trust%20Management%20Framework%22%22>>, pp. 114-130.
"OASIS", Security Assertion Markup Language (SAML), accessed on Sep. 27, 2006 from <<www.oasis-open.org/committees/security>>, 8 pages.
"OASIS", eXtensible Access Control Markup Language (XACML) Version 2.0 Core Specification, 2005, accessed on Sep. 27, 2006 at <<www.oasis-open.org/committees/xacml/>>, 6 pages.
"RFC 3280—Internet X.409 Public Key Infrastructure Certificate and Certificate Revocation List (CRL) Profile", IETF, retrieved on Sep. 22, 2006 from <<http://www.faqs.org/rfcs/rfc3280.html>>, Apr. 2002, 8 pages.
Ribeiro, et al., "SPL: An access control language for security policies with comples constraints", retrieved at <<http://www.gsd.inesc-id.pt/~cnr/splii.pdf>>, IST/INESC, Portugal, pp. 1-22.
Rivest, et al., "SDSI—A Simple Distributed Security Infrastructure", available at <<http://theory.lcs.mit.edu/~rivest/sdsi10.ps>>, Apr. 30, 1996, pp. 1-37.
Wu, et al., "Evaluation of Authorization-Authentication Tools: PERMIS, OASIS, XACML, and SHIBOLETH", Technical Report CS-TR-935, University of Newcastle upon Tyne, 2005.
PCT Search Report for Applicaiotn No. PCT/US2007/077898, mailed on Feb. 5, 2008, 10 pgs.
PCT Search Report for Application No. PCT/US2007/078081, mailed on Jan. 22, 2008, 10 pgs.
Cederquist et al., "An Audit Logic for Accountability", IEEE, 2005, pp. #1-pp. #10.
Hughs et al., "Security Assertion Markup Language (SAML) 2.0 Technical Overview", OASIS, 2004, pp. #1-pp. #36.
Farrell et al., "Assertions and Protocols for the OASIS Security Assertion Markup Language (SAML) V2.0", OASIS Open, 2004, Aug. 2004, pp. #1-pp. #87.
Office Action from the U.S. Patent and Trademark Office for U.S. Appl. No. 11/530,433, mailed Mar. 1, 2009, 26 pages.
Office Action from the U.S. Patent and Trademark Office for U.S. Appl. No. 11/530,429, mailed on Mar. 2, 2010, 21 pages.
Office Action from the U.S. Patent and Trademark Office for U.S. Appl. No. 11/530,427, mailed Mar. 3, 2010, 26 pages.
Hallam-Baker et al., "Web Services Security: SAML Token Profile", OASIS Open, Sep. 23, 2002, pp. #1-pp. #25.
Hallam-Barker, "Security Assertion Markup Language Straw-man Architecture", VeriSign, 2001, Feb. 16, 2001, pp. #1-pp. #17.
Keoh et al., "Towards Flexible Credential Verification in Mobile Ad-hoc Networks", ACM 2002, POMC '02, Oct. 30-31, 2002, pp. #58-pp. #65.
Navarro et al., "Constrained Delegation in XML-based Access Control and Digital Right Management Standards", Communication, Network and Information Security 2003, pp. #1-pp. #6.
Office Action from the U.S. Patent and Trademark Office for U.S. Appl. No. 11/530,439, mailed on Mar. 5, 2010, 32 pages.
Office Action from the U.S. Patent and Trademark Office for U.S. Appl. No. 11/530,438, mailed May 20, 2010, 35 pages.
Office Action from the U.S. Patent and Trademark Office for U.S. Appl. No. 11/530,443, mailed on Jun. 1, 2010, 30 pages.
Office Action from the U.S. Patent and Trademark Office for U.S. Appl. No. 11/530,543, mailed on Jul. 8, 2010, 12 pages.
Office Action from the U.S. Patent and Trademark Office for U.S. Appl. No. 11/530,427, mailed on Aug. 20, 2010, 23 pages.
Office Action from the U.S. Patent and Trademark Office for U.S. Appl. No. 11/530,429, mailed on Aug. 20, 2009, 24 pages.
Office Action from the U.S. Patent and Trademark Office for U.S. Appl. No. 11/530,433, mailed on Aug. 21, 2009, 24 pages.
Wang et al., "Extending the Security Assertion Markup Language to Support Delegation for Web Services and Grid Services", IEEE International Conference on Web Services 2005, Orlando, Fl, Jul. 12-15, 2005, pp. #1-pp. #8.
Dai et al., "Logic Based Authorization Policy Engineering", 2001, pp. #1-pp. #9.
Office Action from the U.S. Patent and Trademark Office for U.S. Appl. No. 11/530,438, mailed Oct. 29, 2010, 31 pages.
Office Action from the U.S. Patent and Trademark Office for U.S. Appl. No. 11/530,556, mailed on Aug. 23, 2010, 14 pages.
Office Action from the U.S. Patent and Trademark Office for U.S. Appl. No. 11/530,564, mailed on Sep. 15, 2010, 17 pages.
Notice of Allowance from the U.S. Patent and Trademark Office for U.S. Appl. No. 11/530,439, mailed Aug. 23, 2010, 22 pages.
Pfenning et al., "System Description: Twelf- A Meta-Logical Framework for Deductive Systems", 1999, pp. #1-pp. #5.
Whitehead et al., "By Reason and Authority: A System for Authorization of Proof-Carrying Code", IEEE Computer Secuirty Foundations Workshop (CSFW'04) 2004, pp. #1-pp. #15.
Chadwick, "An Authorisation Interface for the GRID", In the Proceedings of the E-Science All Hands Meeting, Nottingham, Sep. 2003, 14 pgs.
Translated Chinese Notice of Grant of Patent Right for Invention mailed Mar. 25, 2011 for Chinese Patent Application No. 200780033322.4 a counterpart foreign application for U.S. Appl. No. 11/530,438, 4 pages.
Translated Chinese Office Action mailed Jan. 26, 2011 for Chinese Patent Application No. 200780033359.7, a counterpart foreign application for U.S. Appl. No. 11/530,446, 8 pages.
Erdos, et al., "Shibboleth-Architecture", Draft Version 4, Nov. 2001, 39 pgs.
Office Action from the U.S. Patent and Trademark Office for U.S. Appl. No. 11/530,556 mailed on Feb. 4, 2011, 8 pages.
Office Action from the U.S. Patent and Trademark Office for U.S. Appl. No. 11/530,443, mailed Dec. 7, 2010, 21 pgs.
Office Action from the U.S. Patent and Trademark Office for U.S. Appl. No. 11/530,543, mailed on Dec. 27, 2010, 17 pgs.
Lee, et al., "Security Assertion Exchange for the Agent on the Semantic Web", In the Proceedings of the IADIS International Conference WWW/Internet, Madrid, Spain, 2 Volumes, 2004, pp. 302-308 (9 pgs.).
Office Action from the U.S. Patent and Trademark Office for U.S. Appl. No. 11/530,433 mailed on Jan. 18, 2011, 35 pages.
Office Action from the U.S. Patent and Trademark Office for U.S. Appl. No. 11/530,429, mailed on Jan. 19, 2011, 34 pgs.
Office Action from the U.S. Patent and Trademark Office for U.S. Appl. No. 11/530,446 mailed on Feb. 3, 2011, 35 pages.
Office Action from the U.S. Patent and Trademark Office for U.S. Appl. No. 11/530,427, mailed on Dec. 23, 2010, 33 pages.
Notice of Allowance from the U.S. Patent and Trademark Office for U.S. Appl. No. 11/530,438, mailed Apr. 4, 2011, 8 pages.
Office Action for U.S. Appl. No. 11/530,564, mailed on Apr. 12, 2011, Moritz Becker, "Security Language Expressions for Logic Resolution".
Non-Final Office Action for U.S. Appl. No. 11/530,443, mailed on May 26, 2011, Blair B. Dillaway, "Security Assertion Revocation".
Final Office Action for U.S. Appl. No. 11/530,427, mailed on Jun. 29, 2011, Blair B. Dillaway, "Variable Expressions in Security Assertions".
Chapin, et al., "Risk Assessment in Distributed Authorization", In the Proceedings of the 2005 ACM Workshop on Formal Methods in Security Engineering, 2005, pp. 33-42.
DeTreville, "Binder, a Logic-Based Security Language", IEEE Computer Society, In the Proceedings of the 2002 IEEE Symposium on Security and Privacy, 2002, 10 pgs.
The Extended European Search Report mailed Jul. 22, 2011 for European patent application No. 07842066.8.
Kagal, et al., "Trust-Based Security in Pervasive Computing Environments", IEEE Computer, Dec. 1, 2011, vol. 34, No. 12, pp. 154-157.
Final Office Action for U.S. Appl. No. 11/530,429, mailed on Jul. 8, 2011, Blair B. Dillaway, "Authorization Decisions with Principal Attributes".

Final Office Action for U.S. Appl. No. 11/530,433, mailed on Jul. 8, 2011, Blair B. Dillaway, "Fact Qualifiers in Security Scenarios".
Office Action for U.S. Appl. No. 12/902,892, mailed on Aug. 5, 2011, Blair B. Dillaway, "Auditing Authorization Decisions".
Upadhyay, et al., "Generic Security Service API Version 2: Java Bindings Update: draft-ietf-kitten-rfc2853bis-01.txt", IETF Standard-Working-Draft, Internet Engineering Task Force, IETF, CH, vol. kitten, No. 1, Jan. 27, 2006.
Wainer, et al., "A Fine-Grained, Controllable, User-to-User Delegatino Method in RBAC", Proceedings of the Tenth ACM Symposium on Access Control Models and Technologies, SACMAT, Jan. 1, 2005, p. 59.
Yin, et al., "A Rule-based Framework for Role-based Constrained Delegation", Proceedings of the 3rd International Conference on Information Security, INFOSECU, Jan. 1, 2004, p. 186.
Translated Chinese Office Action mailed Aug. 25, 2011 for Chinese patent application No. 2007800333591, a counterpart foreign application of U.S. Appl. No. 11/530,446, 15 pages.
Advisory Action for U.S. Appl. No. 11/530,427, mailed on Sep. 26, 2011, Blair B. Dillaway, "Variable Expressions in Security Assertions", 4 pgs.
Advisory Action for U.S. Appl. No. 11/530,433, mailed on Sep. 27, 2011, Blair B. Dillaway, "Fact Qualifiers in Security Scenarios", 3 pgs.
The Chinese Office Action mailed Jan. 30, 2012 for Chinese patent application No. 201110162110.4, a counterpart foreign application of US patent No. 8,060,931, 6 pages.
Abadi, "Logic in Access Control", Proceedings 18th Annual IEEE Symposium on Logic in Computer Science, Jun. 22-25, 2003, Ottawa, Ontario, Canada, pp. 228-233.

Becker, et al., "SecPAL: Design and Semantics of a Decentralized Authorization Language—Technical Report MSR-TR-2006-120", Sep. 1, 2006, Microsoft Research, Cambridge, UK, retrieved from the Internet at http://courses.cs.vt.edu/cs5204/fall10-kafura-NVC/Papers/Security/SecPal-Reference.pdf on Dec. 21, 2011, 46 pgs.
Chen, et al., "Tabled Evaluations with Delaying for General Logic Programs", Journal of the ACM, vol. 43, No. 1, Jan. 1996, pp. 20-74.
The European Office Action mailed Dec. 22, 2011 for European patent application No. 07841896.9, a counterpart foreign application of US patent No. 8060931, 4 pages.
The Extended European Search Report mailed Jan. 18, 2012 for European patent application No. 07842186.4, 9 pages.
Translated Japanese Office Action mailed Jan. 24, 2012 for Japanese patent application No. 2009-527617, a counterpart foreign application of US patent application No. 11530556, 14 pages.
Pimlott, et al., "Soutei, a Logic-Based Trust-Management System", Functional and Logic Programming, 8th International Symposium, FLOPS 2006 Proceedings, LNCS 3945, Apr. 24-26, 2006, pp. 130-145.
Chinese Office Action mailed Apr. 5, 2012 for Chinese patent application No. 200780033359.7, a counterpart foreign application of U.S. Appl. No. 11/530,446, 9 pages.
European Office Action mailed, 2012 for European patent application No. 07842066.8, a counterpart foreign application of U.S. Appl. No. 11/530,446, 5 pages.

* cited by examiner

Example Assertion Format

Example Delegation Mechanism 600 and Delegation Scenario

Delegation Mechanism 600
and
Example Delegation Types 714

CONTROLLING THE DELEGATION OF RIGHTS

BACKGROUND

Computers and other electronic devices are pervasive in the professional and personal lives of people. In professional settings, people exchange and share confidential information during project collaborations. In personal settings, people engage in electronic commerce and the transmission of private information. In these and many other instances, electronic security is deemed to be important.

Electronic security paradigms can keep professional information confidential and personal information private. Electronic security paradigms may involve some level of encryption and/or protection against malware, such as viruses, worms, and spyware. Both encryption of information and protection from malware have historically received significant attention, especially in the last few years.

However controlling access to information is an equally important aspect of securing the safety of electronic information. This is particularly true for scenarios in which benefits are derived from the sharing and/or transferring of electronic information. In such scenarios, certain people are to be granted access while others are to be excluded.

Access control has been a common feature of shared computers and application servers since the early time-shared systems. There are a number of different approaches that have been used to control access to information. They share a common foundation in combining authentication of the entity requesting access to some resource with a mechanism of authorizing the allowed access. Authentication mechanisms include passwords, Kerberos, and x.509 certificates. Their purpose is to allow a resource-controlling entity to positively identify the requesting entity or information about the entity that it requires.

Authorization examples include access control lists (ACLs) and policy-based mechanisms such as the eXtensible Access Control Markup Language (XACML) or the PrivilEge and Role Management Infrastructure (PERMIS). These mechanisms define what entities may access a given resource, such as files in a file system, hardware devices, database information, and so forth. They perform this authorization by providing a mapping between authenticated information about a requestor and the allowed access to a resource.

As computer systems have become more universally connected over large networks such as the Internet, these mechanisms have proven to be somewhat limited and inflexible in dealing with evolving access control requirements. Systems of geographically dispersed users and computer resources, including those that span multiple administrative domains, in particular present a number of challenges that are poorly addressed by currently-deployed technology.

SUMMARY

The delegation of rights may be controlled in a number of manners. In an example implementation, a delegation authority assertion is formulated with a delegator principal, a delegatee principal, a verb phrase, a resource, and a delegation-directive verb. In another example implementation, a delegation mechanism involving an assertor, a first principal, and a second principal enables a delegation to be specifically controlled. In yet another example implementation, a chained delegation mechanism enables explicit control of a permitted transitive chaining depth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, protocol, etc. implementations are described herein.

BRIEF DESCRIPTION OF THE DRAWINGS

The same numbers are used throughout the drawings to reference like and/or corresponding aspects, features, and components.

DETAILED DESCRIPTION

Example Security Environments

Figure 1:
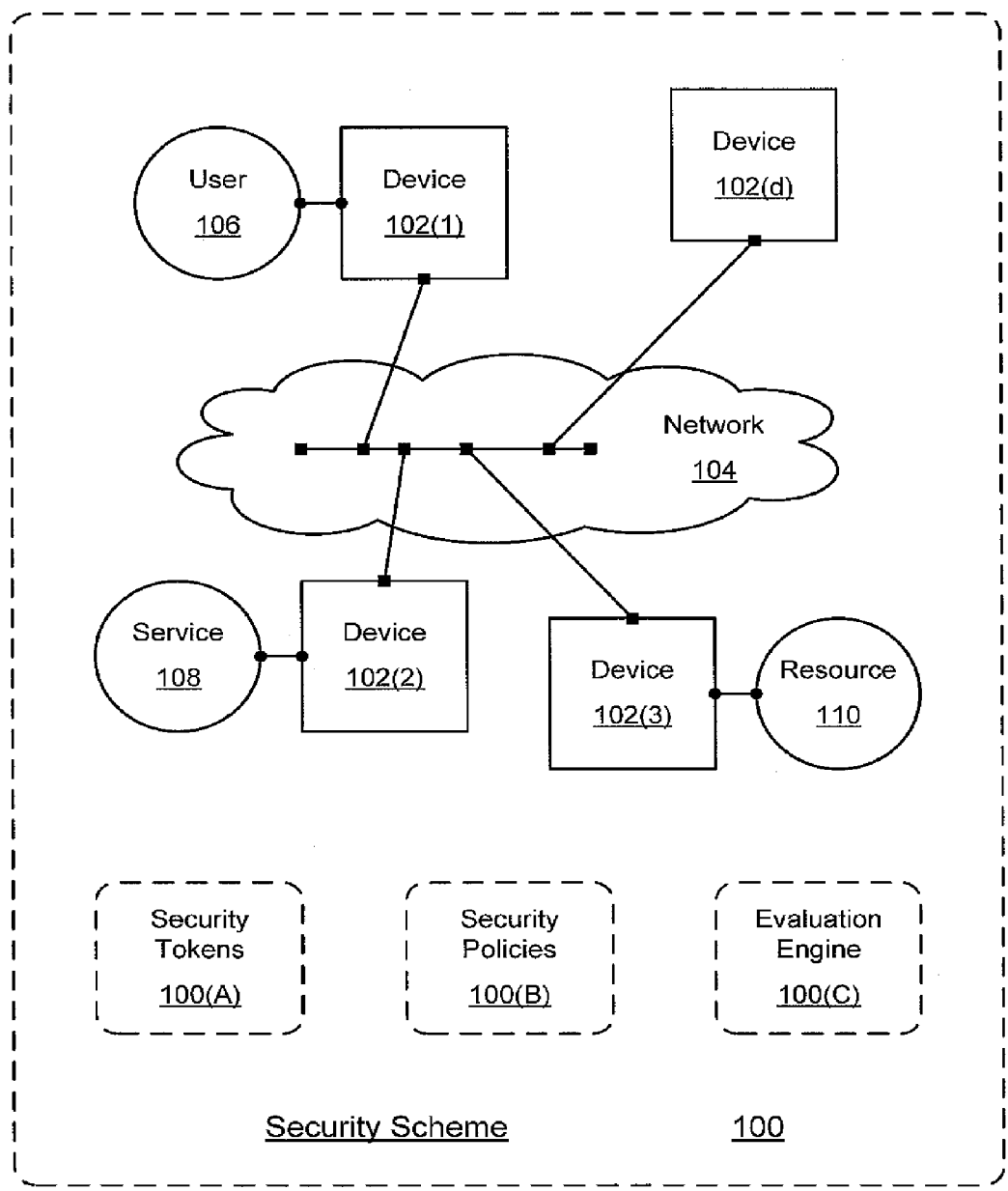
FIG. 1 is a block diagram illustrating an example general environment in which an example security scheme may be implemented.

FIG. 1 is a block diagram illustrating an example general environment in which an example security scheme 100 may be implemented. Security scheme 100 represents an integrated approach to security. As illustrated, security scheme 100 includes a number of security concepts: security tokens 100(A), security policies 100(B), and an evaluation engine 100(C). Generally, security tokens 100(A) and security policies 100(B) jointly provide inputs to evaluation engine 100 (C). Evaluation engine 100(C) accepts the inputs and produces an authorization output that indicates if access to some resource should be permitted or denied.

In a described implementation, security scheme 100 can be overlaid and/or integrated with one or more devices 102, which can be comprised of hardware, software, firmware, some combination thereof, and so forth. As illustrated, "d" devices, with "d" being some integer, are interconnected over one or more networks 104. More specifically, device 102(1), device 102(2), device 102(3) . . . device 102(d) are capable of communicating over network 104.

Each device 102 may be any device that is capable of implementing at least a part of security scheme 100. Examples of such devices include, but are not limited to, computers (e.g., a client computer, a server computer, a personal computer, a workstation, a desktop, a laptop, a palmtop, etc.), game machines (e.g., a console, a portable game device, etc.), set-top boxes, televisions, consumer electronics (e.g., DVD player/recorders, camcorders, digital video recorders (DVRs), etc.), personal digital assistants (PDAs), mobile phones, portable media players, some combination thereof, and so forth. An example electronic device is described herein below with particular reference to FIG. 4.

Network 104 may be formed from any one or more networks that are linked together and/or overlaid on top of each other. Examples of networks 104 include, but are not limited to, an internet, a telephone network, an Ethernet, a local area network (LAN), a wide area network (WAN), a cable network, a fibre network, a digital subscriber line (DSL) network, a cellular network, a Wi-Fi® network, a WiMAX® network, a virtual private network (VPN), some combination thereof, and so forth. Network 104 may include multiple domains, one or more grid networks, and so forth. Each of these networks or combination of networks may be operating in accordance with any networking standard.

As illustrated, device 102(1) corresponds to a user 106 that is interacting with it. Device 102(2) corresponds to a service 108 that is executing on it. Device 102(3) is associated with a resource 110. Resource 110 may be part of device 102(3) or separate from device 102(3).

User 106, service 108, and a machine such as any given device 102 form a non-exhaustive list of example entities. Entities, from time to time, may wish to access resource 110. Security scheme 100 ensures that entities that are properly authenticated and authorized are permitted to access resource 110 while other entities are prevented from accessing resource 110.

Figure 2:
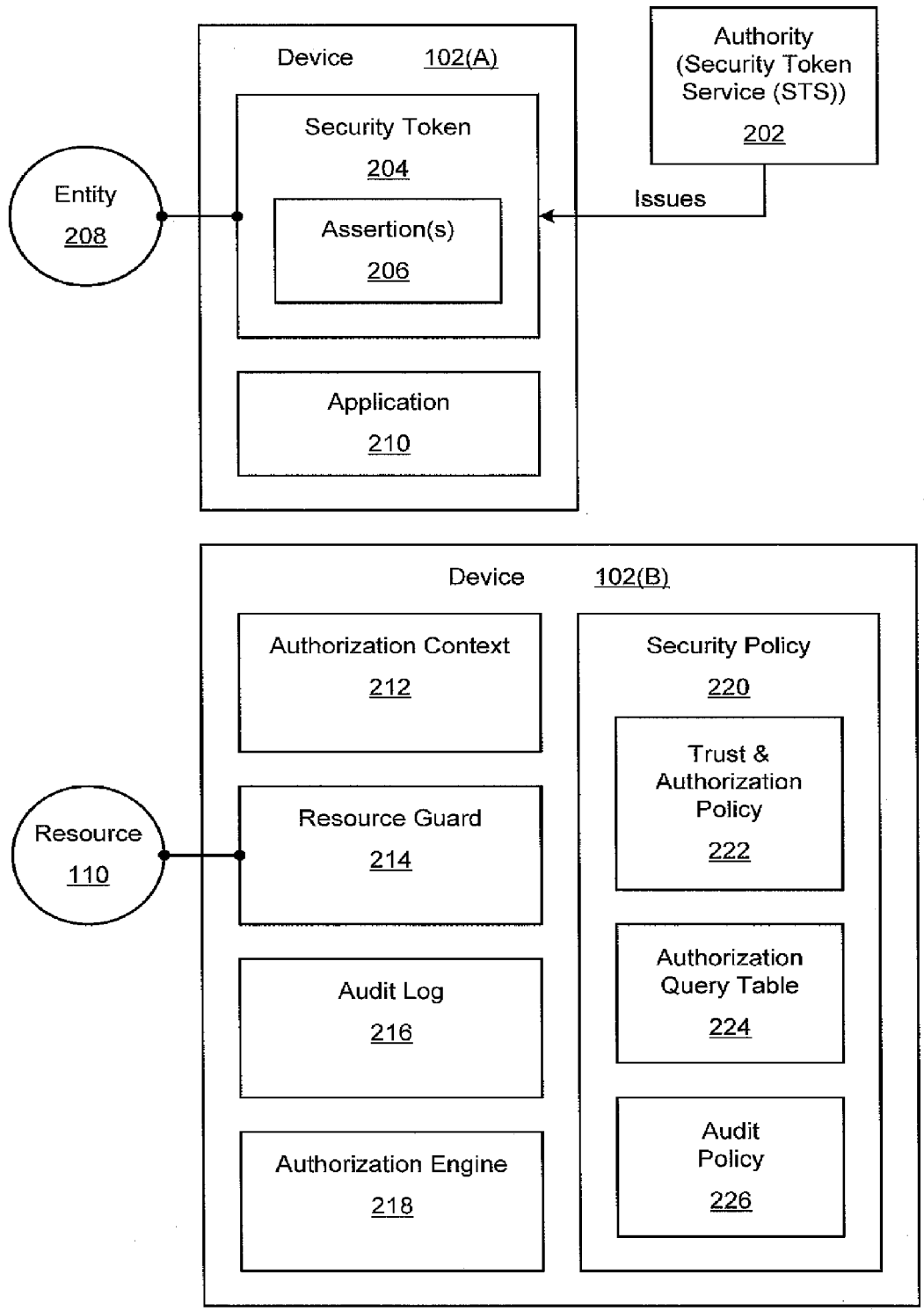
FIG. 2 is a block diagram illustrating an example security environment having two devices and a number of example security-related components.

FIG. 2 is a block diagram illustrating an example security environment 200 having two devices 102(A) and 102(B) and a number of example security-related components. Security environment 200 also includes an authority 202, such as a security token service (STS) authority. Device 102(A) corresponds to an entity 208. Device 102(B) is associated with resource 110. Although a security scheme 100 may be implemented in more complex environments, this relatively-simple two-device security environment 200 is used to describe example security-related components.

As illustrated, device 102(A) includes two security-related components: a security token 204 and an application 210. Security token 204 includes one or more assertions 206. Device 102(B) includes five security-related components: an authorization context 212, a resource guard 214, an audit log 216, an authorization engine 218, and a security policy 220. Security policy 220 includes a trust and authorization policy 222, an authorization query table 224, and an audit policy 226.

Each device 102 may be configured differently and still be capable of implementing all or a part of security scheme 100. For example, device 102(A) may have multiple security tokens 204 and/or applications 210. As another example, device 102(B) may not include an audit log 216 or an audit policy 226. Other configurations are also possible.

In a described implementation, authority 202 issues security token 204 having assertions 206 to entity 208. Assertions 206 are described herein below, including in the section entitled "Security Policy Assertion Language Example Characteristics". Entity 208 is therefore associated with security token 204. In operation, entity 208 wishes to use application 210 to access resource 110 by virtue of security token 204.

Resource guard 214 receives requests to access resource 110 and effectively manages the authentication and authorization process with the other security-related components of device 102(B). Trust and authorization policy 222, as its name implies, includes policies directed to trusting entities and authorizing actions within security environment 200. Trust and authorization policy 222 may include, for example, security policy assertions (not explicitly shown in FIG. 2). Authorization query table 224 maps requested actions, such as access requests, to an appropriate authorization query. Audit policy 226 delineates audit responsibilities and audit tasks related to implementing security scheme 100 in security environment 200.

Authorization context 212 collects assertions 206 from security token 204, which is/are used to authenticate the requesting entity, and security policy assertions from trust and authorization policy 222. These collected assertions in authorization context 212 form an assertion context. Hence, authorization context 212 may include other information in addition to the various assertions.

The assertion context from authorization context 212 and an authorization query from authorization query table 224 are provided to authorization engine 218. Using the assertion context and the authorization query, authorization engine 218 makes an authorization decision. Resource guard 214 responds to the access request based on the authorization decision. Audit log 216 contains audit information such as, for example, identification of the requested resource 110 and/or the algorithmic evaluation logic performed by authorization engine 218.

Figure 3:
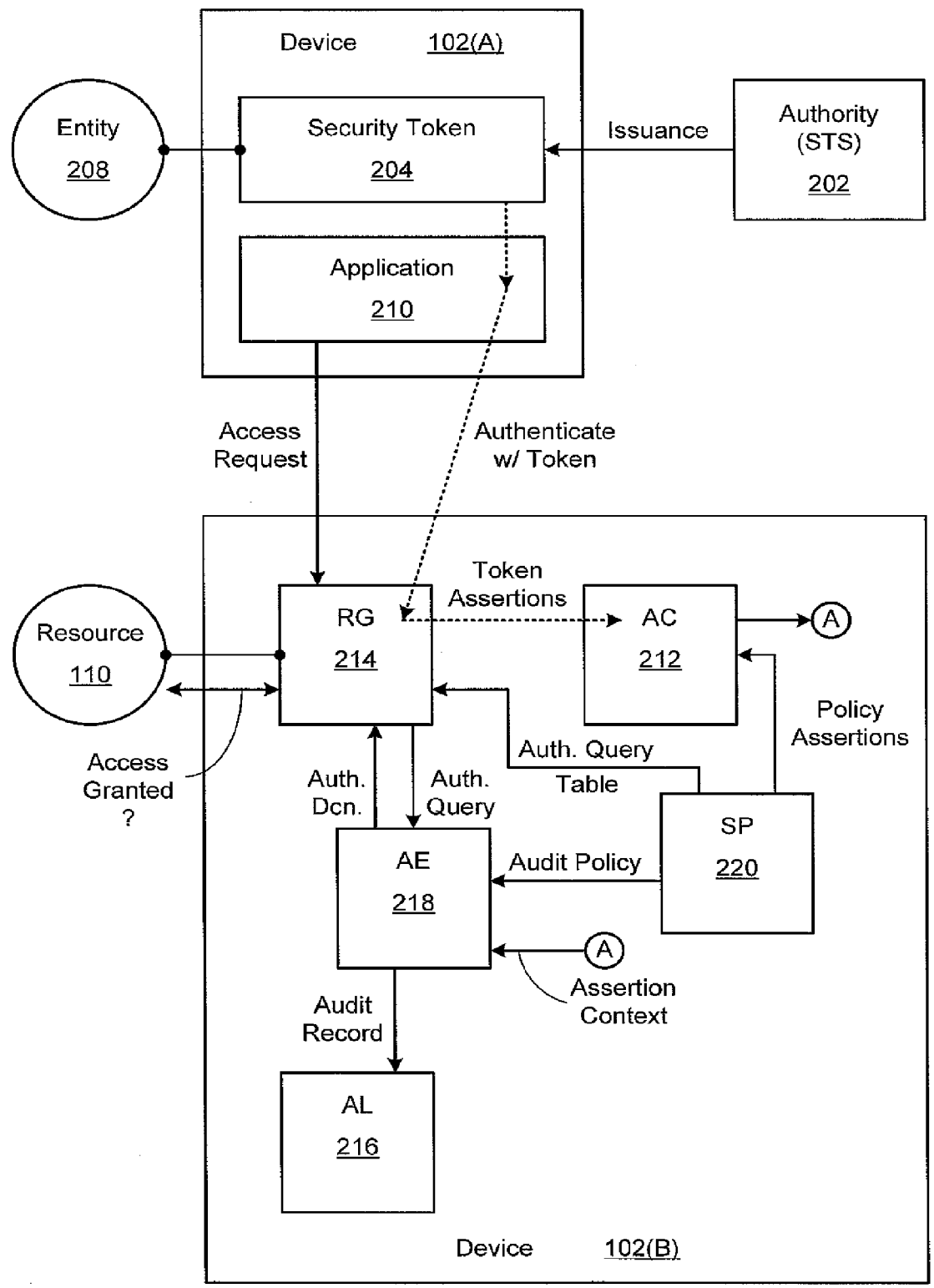
FIG. 3 is a block diagram illustrating the example security environment of FIG. 2 in which example security-related data is exchanged among the security-related components.

FIG. 3 is a block diagram illustrating example security environment 200 in which example security-related data is exchanged among the security-related components. The security-related data is exchanged in support of an example access request operation. In this example access request operation, entity 208 wishes to access resource 110 using application 210 and indicates its authorization to do so with security token 204. Hence, application 210 sends an access request* to resource guard 214. In this description of FIG. 3, an asterisk (i.e., "*") indicates that the stated security-related data is explicitly indicated in FIG. 3.

In a described implementation, entity 208 authenticates* itself to resource guard 214 with a token*, security token 204. Resource guard 214 forwards the token assertions* to authorization context 212. These token assertions are assertions 206 (of FIG. 2) of security token 204. Security policy 220 provides the authorization query table* to resource guard 214. The authorization query table derives from authorization query table module 224. The authorization query table sent to resource guard 214 may be confined to the portion or portions directly related to the current access request.

Policy assertions are extracted from trust and authorization policy 222 by security policy 220. The policy assertions may include both trust-related assertions and authorization-related assertions. Security policy 220 forwards the policy assertions* to authorization context 212. Authorization context 212 combines the token assertions and the policy assertions into an assertion context. The assertion context* is provided from authorization context 212 to authorization engine 218 as indicated by the encircled "A".

An authorization query is ascertained from the authorization query table. Resource guard 214 provides the authorization query (auth. query*) to authorization engine 218. Authorization engine 218 uses the authorization query and the assertion context in an evaluation algorithm to produce an authorization decision. The authorization decision (auth. dcn.*) is returned to resource guard 214. Whether entity 208 is granted access* to resource 110 by resource guard 214 is dependent on the authorization decision. If the authorization decision is affirmative, then access is granted. If, on the other hand, the authorization decision issued by authorization engine 218 is negative, then resource guard 214 does not grant entity 208 access to resource 110.

The authorization process can also be audited using semantics that are complementary to the authorization process. The auditing may entail monitoring of the authorization process and/or the storage of any intermediate and/or final products of, e.g., the evaluation algorithm logically performed by authorization engine 218. To that end, security policy 220 provides to authorization engine 218 an audit policy* from audit policy 226. At least when auditing is requested, an audit record* having audit information may be forwarded from authorization engine 218 to audit log 216. Alternatively, audit information may be routed to audit log 216 via resource guard 214, for example, as part of the authorization decision or separately.

Figure 4:
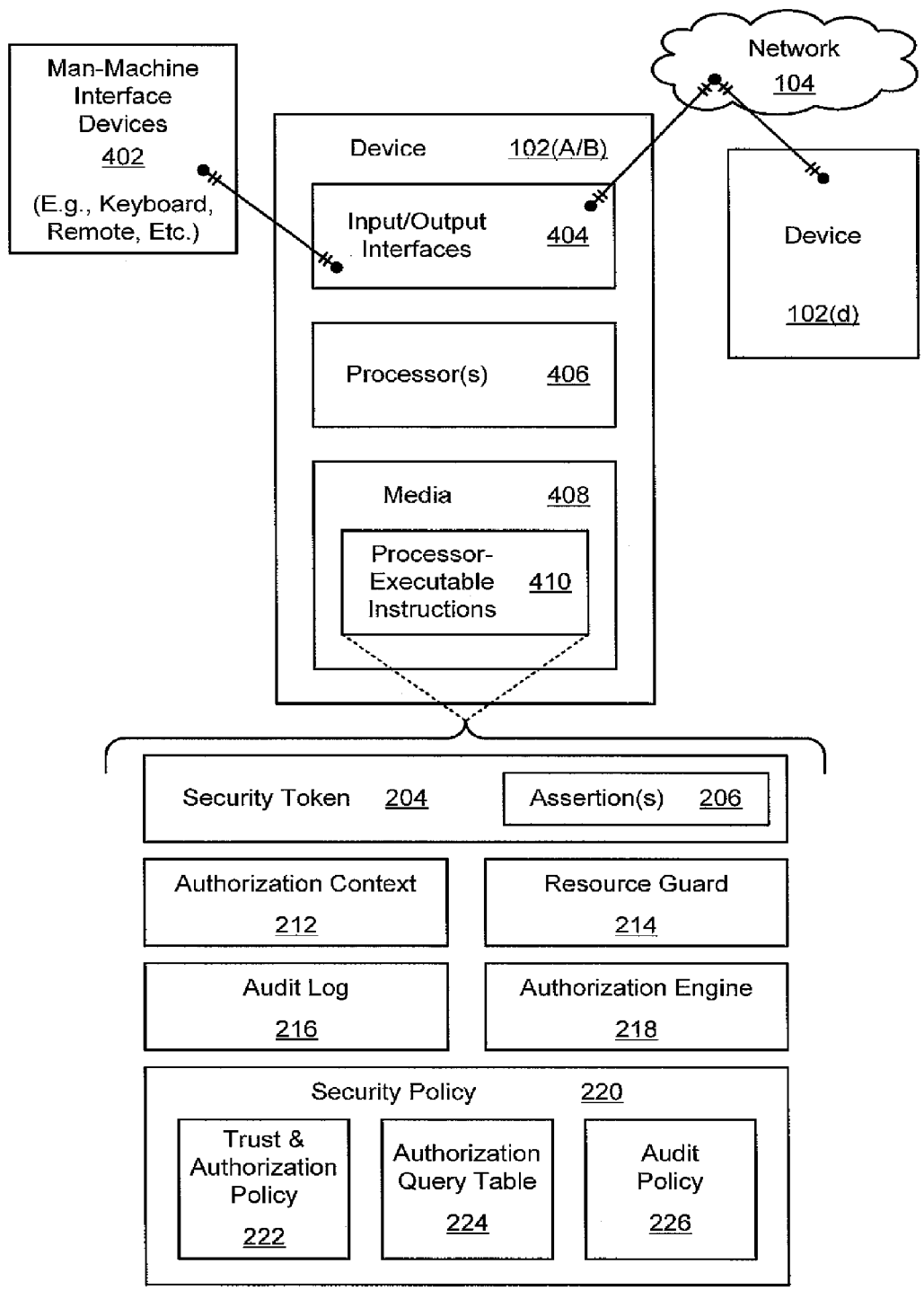
FIG. 4 is a block diagram of an example device that may be used for security-related implementations as described herein.

FIG. 4 is a block diagram of an example device 102 that may be used for security-related implementations as described herein. Multiple devices 102 are capable of communicating across one or more networks 104. As illustrated, two devices 102(A/B) and 102(d) are capable of engaging in communication exchanges via network 104. Although two devices 102 are specifically shown, one or more than two devices 102 may be employed, depending on the implementation.

Generally, a device 102 may represent any computer or processing-capable device, such as a client or server device; a workstation or other general computer device; a PDA; a mobile phone; a gaming platform; an entertainment device; one of the devices listed above with reference to FIG. 1; some combination thereof; and so forth. As illustrated, device 102 includes one or more input/output (I/O) interfaces 404, at least one processor 406, and one or more media 408. Media 408 include processor-executable instructions 410.

In a described implementation of device 102, I/O interfaces 404 may include (i) a network interface for communicating across network 104, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Printing device interfaces may similarly be included as part of I/O interfaces 404. Examples of (iii) man-machine interfaces include those that communicate by wire or wirelessly to man-machine interface devices 402 (e.g., a keyboard, a remote, a mouse or other graphical pointing device, etc.).

Generally, processor 406 is capable of executing, performing, and/or otherwise effectuating processor-executable instructions, such as processor-executable instructions 410. Media 408 is comprised of one or more processor-accessible media. In other words, media 408 may include processor-executable instructions 410 that are executable by processor 406 to effectuate the performance of functions by device 102.

Thus, realizations for security-related implementations may be described in the general context of processor-executable instructions. Generally, processor-executable instructions include routines, programs, applications, coding, modules, protocols, objects, components, metadata and definitions thereof, data structures, application programming interfaces (APIs), schema, etc. that perform and/or enable particular tasks and/or implement particular abstract data types. Processor-executable instructions may be located in separate storage media, executed by different processors, and/or propagated over or extant on various transmission media.

Processor(s) 406 may be implemented using any applicable processing-capable technology. Media 408 may be any available media that is included as part of and/or accessible by device 102. It includes volatile and non-volatile media, removable and non-removable media, and storage and transmission media (e.g., wireless or wired communication channels). For example, media 408 may include an array of disks/flash memory/optical media for longer-term mass storage of processor-executable instructions 410, random access memory (RAM) for shorter-term storing of instructions that are currently being executed, link(s) on network 104 for transmitting communications (e.g., security-related data), and so forth.

As specifically illustrated, media 408 comprises at least processor-executable instructions 410. Generally, processor-executable instructions 410, when executed by processor 406, enable device 102 to perform the various functions described herein, including those actions that are illustrated in the various flow diagrams. By way of example only, processor-executable instructions 410 may include a security token 204, at least one of its assertions 206, an authorization context module 212, a resource guard 214, an audit log 216, an authorization engine 218, a security policy 220 (e.g., a trust and authorization policy 222, an authorization query table 224, and/or an audit policy 226, etc.), some combination thereof, and so forth. Although not explicitly shown in FIG. 4, processor-executable instructions 410 may also include an application 210 and/or a resource 110.

Security Policy Assertion Language Example Characteristics

This section describes example characteristics of an implementation of a security policy assertion language (SecPAL). The SecPAL implementation of this section is described in a relatively informal manner and by way of example only. It has an ability to address a wide spectrum of security policy and security token obligations involved in creating an end-to-end solution. These security policy and security token obligations include, by way of example but not limitation: describing explicit trust relationships; expressing security token issuance policies; providing security tokens containing identities, attributes, capabilities, and/or delegation policies; expressing resource authorization and delegation policies; and so forth.

In a described implementation, SecPAL is a declarative, logic-based language for expressing security in a flexible and tractable manner. It can be comprehensive, and it can provide a uniform mechanism for expressing trust relationships, authorization policies, delegation policies, identity and attribute assertions, capability assertions, revocations, audit requirements, and so forth. This uniformity provides tangible benefits in terms of making the security scheme understandable and analyzable. The uniform mechanism also improves security assurance by allowing one to avoid, or at least significantly curtail, the need for semantic translation and reconciliation between disparate security technologies.

A SecPAL implementation may include any of the following example features: [1] SecPAL can be relatively easy to understand. It may use a definitional syntax that allows its assertions to be read as English-language sentences. Also, its grammar may be restrictive such that it requires users to understand only a few subject-verb-object (e.g., subject-verb phrase) constructs with cleanly defined semantics. Finally, the algorithm for evaluating the deducible facts based on a collection of assertions may rely on a small number of relatively simple rules.

[2] SecPAL can leverage industry standard infrastructure in its implementation to ease its adoption and integration into existing systems. For example, an extensible markup language (XML) syntax may be used that is a straightforward mapping from the formal model. This enables use of standard parsers and syntactic correctness validation tools. It also allows use of the W3C XML Digital Signature and Encryption standards for integrity, proof of origin, and confidentiality.

[3] SecPAL may enable distributed policy management by supporting distributed policy authoring and composition. This allows flexible adaptation to different operational models governing where policies, or portions of policies, are authored based on assigned administrative duties. Use of standard approaches to digitally signing and encrypting policy objects allow for their secure distribution. [4] SecPAL enables an efficient and safe evaluation. Simple syntactic checks on the inputs are sufficient to ensure evaluations will terminate and produce correct answers.

[5] SecPAL can provide a complete solution for access control requirements supporting required policies, authorization decisions, auditing, and a public-key infrastructure (PKI) for identity management. In contrast, most other approaches only manage to focus on and address one subset of the spectrum of security issues. [6] SecPAL may be sufficiently expressive for a number of purposes, including, but not limited to, handling the security issues for Grid environments and other types of distributed systems. Extensibility is enabled in ways that maintain the language semantics and evaluation properties while allowing adaptation to the needs of specific systems.

Figure 5:
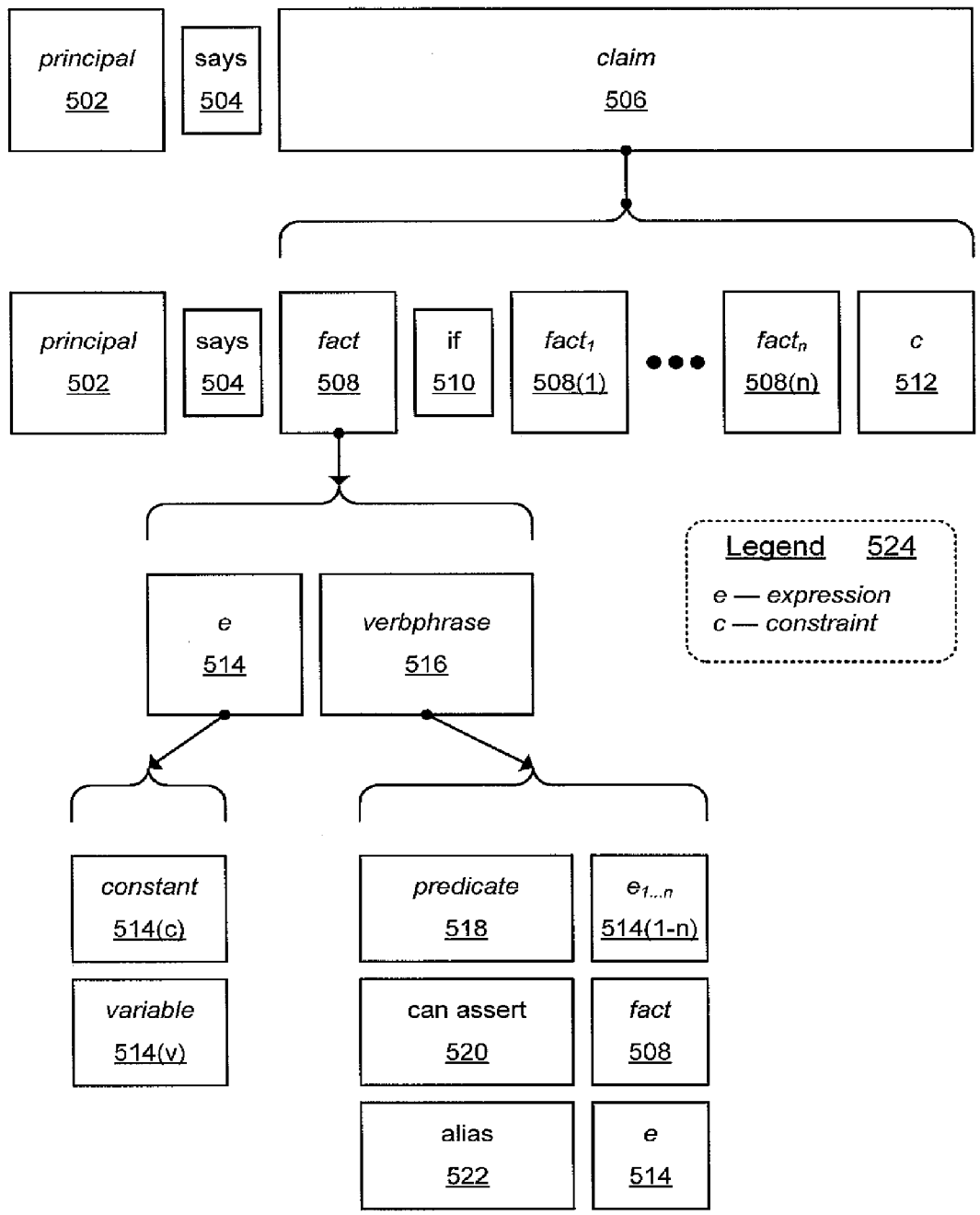
FIG. 5 is a block diagram illustrating an example assertion format for a general security scheme.

FIG. 5 is a block diagram illustrating an example assertion format 500 for a general security scheme. Security scheme assertions that are used in the implementations described otherwise herein may differ from example assertion format 500. However, assertion format 500 is a basic illustration of one example format for security scheme assertions, and it provides a basis for understanding example described implementation of various aspects of a general security scheme.

As illustrated at the top row of assertion format 500, an example assertion at a broad level includes: a principal portion 502, a says portion 504, and a claim portion 506. Textually, the broad level of assertion format 500 may be represented by: principal says claim.

At the next row of assertion format 500, claim portion 506 is separated into example constituent parts. Hence, an example claim portion 506 includes: a fact portion 508, an if portion 510, "n" conditional fact$_{1 \ldots n}$ portions 508(1 ... n), and a c portion 512. The subscript "n" represents some integer value. As indicated by legend 524, c portion 512 represents a constraint portion. Although only a single constraint is illustrated, c portion 512 may actually represent multiple constraints (e.g., $c_1, \ldots, c_m$). The set of conditional fact portions 508(1 ... n) and constraints 512(1 ... m) on the right-hand side of if portion 510 may be termed the antecedent.

Textually, claim portion 506 may be represented by: fact if fact$_1$, ..., fact$_n$, c. Hence, the overall assertion format 500 may be represented textually as follows: principal says fact if fact$_1$, ..., fact$_n$, c. However, an assertion may be as simple as: principal says fact. In this abbreviated, three-part version of an assertion, the conditional portion that starts with if portion 510 and extends to c portion 512 is omitted.

Each fact portion 508 may also be further subdivided into its constituent parts. Example constituent parts are: an e portion 514 and a verb phrase portion 516. As indicated by legend 524, e portion 514 represents an expression portion. Textually, a fact portion 508 may be represented by: e verbphrase.

Each e or expression portion 514 may take on one of two example options. These two example expression options are: a constant 514(c) and a variable 514(v). Principals may fall under constants 514(c) and/or variables 514(v).

Each verb phrase portion 516 may also take on one of three example options. These three example verb phrase options are: a predicate portion 518 followed by one or more $e_{1 \ldots n}$ portions 514(1 ... n), a can assert portion 520 followed by a fact portion 508, and an alias portion 522 followed by an expression portion 514. Textually, these three verb phrase options may be represented by: predicate $e_1 \ldots e_n$, can assert fact, and alias e, respectively. The integer "n" may take different values for facts 508(1 ... n) and expressions 514 (1 ... n).

Generally, SecPAL statements are in the form of assertions made by a security principal. Security principals are typically identified by cryptographic keys so that they can be authenticated across system boundaries. In their simplest form, an assertion states that the principal believes a fact is valid (e.g., as represented by a claim 506 that includes a fact portion 508). They may also state a fact is valid if one or more other facts are valid and some set of conditions are satisfied (e.g., as represented by a claim 506 that extends from a fact portion 508 to an if portion 510 to conditional fact portions 508(1 ... n) to a c portion 512). There may also be conditional facts 508(1 ... n) without any constraints 512 and/or constraints 512 without any conditional facts 508(1 ... n).

In a described implementation, facts are statements about a principal. Four example types of fact statements are described here in this section. First, a fact can state that a principal has the right to exercise an action(s) on a resource with an "action verb". Example action verbs include, but are not limited to, call, send, read, list, execute, write, modify, append, delete, install, own, and so fort. Resources may be identified by universal resource indicators (URIs) or any other approach.

Second, a fact can express the binding between a principal identifier and one or more attribute(s) using the "possess" verb. Example attributes include, but are not limited to, email name, common name, group name, role title, account name, domain name server/service (DNS) name, internet protocol (IP) address, device name, application name, organization name, service name, account identification/identifier (ID), and so forth. An example third type of fact is that two principal identifiers can be defined to represent the same principal using the "alias" verb.

"Qualifiers" or fact qualifiers may be included as part of any of the above three fact types. Qualifiers enable an assertor to indicate environmental parameters (e.g., time, principal location, etc.) that it believes should hold if the fact is to be considered valid. Such statements may be cleanly separated between the assertor and a relying party's validity checks based on these qualifier values.

An example fourth type of fact is defined by the "can assert" verb. This "can assert" verb provides a flexible and powerful mechanism for expressing trust relationships and delegations. For example, it allows one principal (A) to state its willingness to believe certain types of facts asserted by a second principal (B). For instance, given the assertions "A says B can assert fact0" and "B says fact0", it can be concluded that A believes fact0 to be valid and therefore it can be deduced that "A says fact0".

Such trust and delegation assertions may be (i) unbounded and transitive to permit downstream delegation or (ii) bounded to preclude downstream delegation. Although qualifiers can be applied to "can assert" type facts, omitting support for qualifiers to these "can assert" type facts can significantly simplify the semantics and evaluation safety properties of a given security scheme.

In a described implementation, concrete facts can be stated, or policy expressions may be written using variables. The variables are typed and may either be unrestricted (e.g., allowed to match any concrete value of the correct type) or restricted (e.g., required to match a subset of concrete values based on a specified pattern).

Security authorization decisions are based on an evaluation algorithm (e.g., that may be conducted at authorization engine 218) of an authorization query against a collection of assertions (e.g., an assertion context) from applicable security policies (e.g., a security policy 220) and security tokens (e.g., one or more security tokens 204). Authorization queries are logical expressions, which may become quite complex, that combine facts and/or conditions. These logical expressions may include, for example, AND, OR, and/or NOT logical operations on facts, either with or without attendant conditions and/or constraints.

This approach to authorization queries provides a flexible mechanism for defining what must be known and valid before a given action is authorized. Query templates (e.g., from authorization query table 224) form a part of the overall security scheme and allow the appropriate authorization query to be declaratively stated for different types of access requests and other operations/actions.

Example Implementations for Controlling the Delegation of Rights

Modern systems, especially distributed systems, often function more effectively when rights may be delegated between entities. This is manifested in a wide variety of functional situations. Example situations include, but are not limited to:

The ability for a user to delegate some portion of their resource access rights to an application executing on their behalf;

The ability for a manager to delegate some portion of its resource access rights to a subordinate or peer; and The ability for an executing application to delegate its resource access rights to another application.

These types of delegations should typically be controlled in one or more of many various ways. For example, they may be allowed for only restricted periods of time, and they may need to be limited to the particular resources a delegatee needs to perform the intended function. Effective control over the ability to allow downstream delegation of rights can also be beneficial. In other words, it may be beneficial for a delegatee to further delegate downstream some or all of the access rights it has been granted.

Existing systems provide a limited ability to support controlled delegation. In most systems, it is limited to allowing a running program to impersonate a user. Impersonation represents the ability for the delegatee to exercise the full access rights of the delegator. At most, there is some time restriction on this impersonation, but it is typically a default system value, which is measured in hours, and can not be controlled on a per-interaction basis. The Microsoft® Windows® Kerberos implementation further supports the ability for a service to have delegation rights when processing requests on behalf of a user. This allows a service to pass along the right to impersonate the user to another service, but it provides no effective controls for constraining use of this capability. As a result, users of these existing systems must fully trust the delegatee to not abuse its impersonation rights.

The Grid community has developed a delegation approach based on X.509 proxy certificates. These also provide a very limited ability to control a delegation. Although they do allow the setting of a time limit on a particular delegation, they also still allow the delegatee to use the identity and attributes of the delegator when making access requests. The developers of the standard that defines proxy certificates did recognize a need for controlled delegation, and they provided a placeholder where a controlled delegation policy could be inserted into a certificate. However, they did not define any mechanism to express or enforce such controls.

Figure 6:
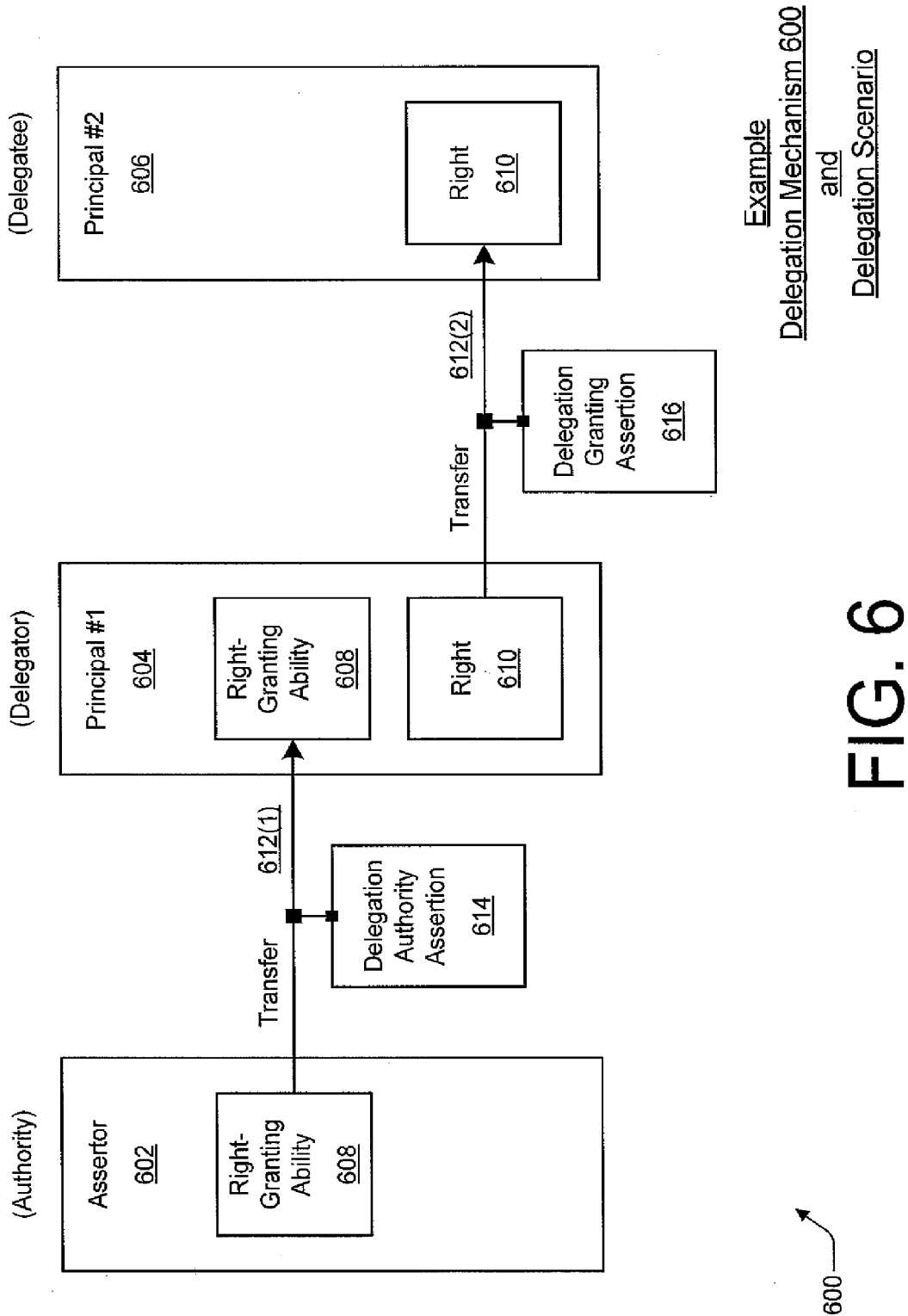
FIG. 6 is a block diagram illustrating an example delegation mechanism from a functional perspective along with an example delegation scenario and including a delegation authority assertion.

FIG. 6 is a block diagram illustrating an example delegation mechanism 600 from a functional perspective along with an example delegation scenario. As illustrated, the example delegation scenario includes an assertor 602, a principal #1 604, and a principal #2 606. There is also a right-granting ability 608, a right 610, and two transfers 612(1) and 612(2). Example delegation mechanism 600 includes delegation authority assertion 614 and, in certain implementations, delegation granting assertion 616.

In a described implementation for the example delegation scenario of FIG. 6, assertor 602 corresponds to an authority, principal #1 604 corresponds to a delegator, and principal #2 606 corresponds to a delegatee. Assertor 602 has a right-granting ability 608. Via transfer 612(1) of delegation authority assertion 614, right-granting ability 608 is delegated from assertor 602 to principal #1 604.

Hence, principal #1 604 gains right-granting ability 608 as a result of delegation authority assertion 614. Principal #1 604 has a right 610. Because of delegation authority assertion 614, principal #1 604 may grant right 610 to one or more other principals, such as principal #2 606. The delegatee principal(s), the nature of the granted right, and/or how the granted right may be exercised is controllable by delegation authority assertion 614. Via transfer 612(2) of delegation granting assertion 616, right 610 is granted from principal #1 604 to principal #2 606. It should be understood that transfer 612(1) may be implicit and that delegation authority assertion 614 may be made known via a security policy to resource guard 214 (of FIG. 2). It is resource guard 214 that enforces resource access based on right 610 and delegation granting assertion 616.

Thus, delegation mechanism 600 includes at least delegation authority assertion 614 and may include delegation granting assertion 616 to complete a full delegation process. Example implementations of delegation authority assertion 614 and delegation granting assertion 616 are described further herein below.

Figure 7:
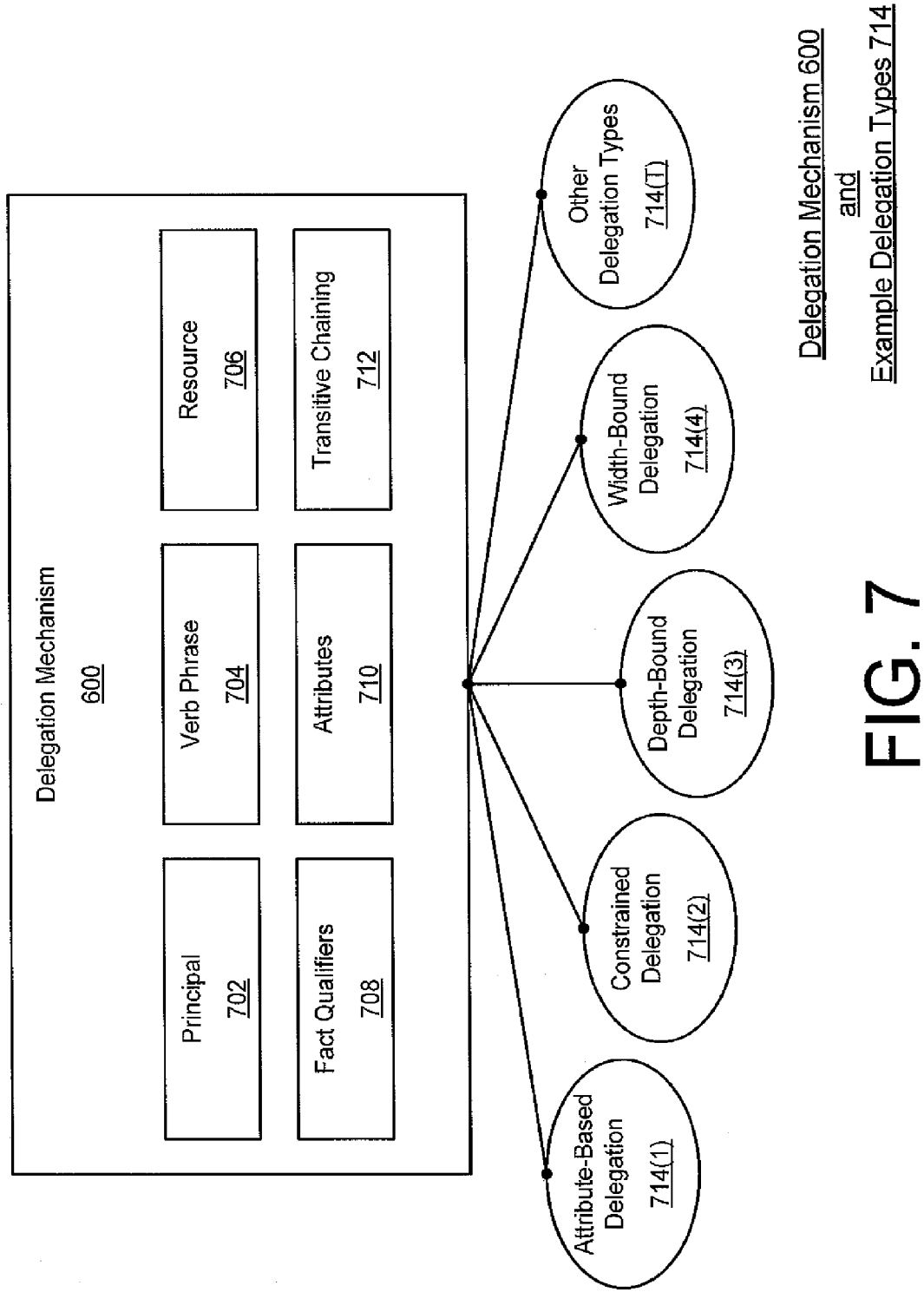
FIG. 7 is a block diagram illustrating an example delegation mechanism from a logical perspective along with example delegation types.

FIG. 7 is a block diagram illustrating an example delegation mechanism 600 from a logical perspective along with example delegation types 714. As illustrated, example delegation mechanism 600 includes a number of example factors 702-712 that may be used to control the delegation of rights. These example factors include, by way of example but not limitation, principal 702, verb phrase 704, resource 706, fact qualifiers 708, attributes 710, transitive chaining 712, and so forth.

Delegation mechanism 600 is capable of implementing a number of different types of delegation control. As illustrated, these example delegation control types include, but are not limited to, attributed-based delegation 714(1), constrained delegation 714(2), depth-bound delegation 714(3), and width-bound delegation 714(4). These four specific example types of controlled delegation are described below in greater detail after additional description of general controlled-delegation concepts and implementations. As representing by other delegation types 714(T), delegation mechanism 600 may be capable of implementing many other types of controlled delegation.

In a described implementation, each of blocks 702-710 logically represents a capability of delegation mechanism 600 to control delegation with respect to the indicated factor. Accordingly, delegation mechanism 600 may control a delegation by way of an identified principal or principals 702, a certain verb phrase 704, a particular resource 706, one or more indicated fact qualifiers 708, at least one given attribute 710, and/or a permitted transitive chaining (depth) 712. By way of example only, delegation mechanism 600 may be realized as an application programming interface (API) that can be used to control delegations using at least the factors of 702-712.

As described herein above, fact qualifiers include environmental restrictions such as time periods/time spans, location, network connectivity mechanism, revocation check frequency, and so forth. Attributes refer to attribute name-attribute value pairs in which a principal may possess one or more or attributes.

Any of these factors may be related to principal #1 604 and/or principal #2 606. In other words, and by way of example only, delegation mechanism 600 may control what accesses (e.g., by way of verb phrases 704) on which resources 706 may be delegated by principal #1 604 to principal #2 606. Delegation mechanism 600 may control which principals qualify as a principal #2 606. Furthermore, delegation mechanism 600 may require that a would-be principal #2 606 possess a given attribute 710. Additionally, restrictive environmental controls on delegation may be enforced through fact qualifiers 708 (e.g., in conjunction with conditional constraints). These and other possibilities are further illuminated by the description herein below.

Delegation mechanism 600 may also control whether transitive chaining delegation is enabled and, if so, to what degree or depth transitive chaining delegation is permitted by transitive chaining factor 712. Transitive chaining refers to whether principal #1 604 is permitted to her transfer or delegate right-granting ability 608 to principal #2 606. If this is permitted, then principal #1 604 is enabled to issue a delegation authority assertion 614 to principal #2 606. Principal #2 606, in turn, is then enabled to issue a delegation granting assertion 616 to some third principal. This transitive chaining delegation is described further herein below with particular reference to FIGS. 9 and 10.

Figure 8:
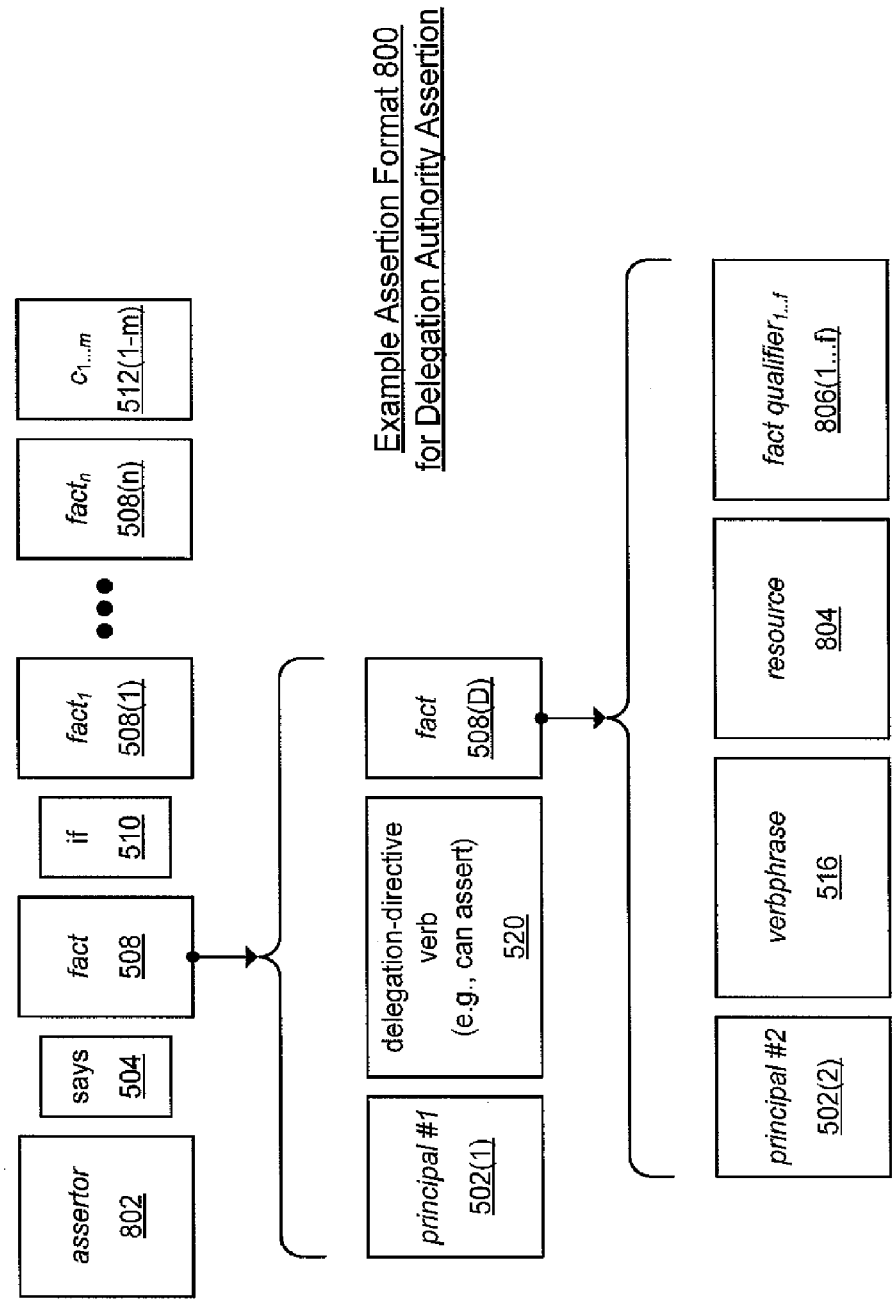
FIG. 8 is a block diagram illustrating an example assertion format for a delegation authority assertion of a delegation mechanism.

FIG. 8 is a block diagram illustrating an example assertion format 800 for a delegation authority assertion of a delegation mechanism. The concept of a delegation authority assertion 614 is introduced and described above (with reference to FIG. 6) as being part of a delegation mechanism 600. A delegation authority assertion 614 initiates a delegation by transferring a right-granting ability 608 from one to another, such as from an assertor to a first principal.

A portion of the example assertion format 500 of FIG. 5 is reproduced in FIG. 8. However, principal portion 502 is replaced by an assertor portion 802, and the capacity for multiple or "m" constraints 512 is explicitly shown. It should be noted that the nomenclature "assertor", "principal #1", and "principal #2" is utilized herein to facilitate differentiation of respective parties in a delegation scenario. However, each party may be considered to be essentially and effectively a principal in the overall scheme of a described security language.

Thus, in a described implementation, example assertion format 800 includes an assertor portion 802, a says portion 504, a fact portion 508, an if portion 510, "n" conditional $fact_{1 \ldots n}$ portions 508(1 . . . n), and "m" $constraint_{1 \ldots m}$ portions 512(1 . . . m). Fact 508 is realized as a delegation fact by including a delegation-directive verb 520. Examples included, by way of example but not limitation, "can assert", "can say", "can profess", "may contend", and so forth. Some delegation-related assertion examples set forth herein below use the specific example of "can assert" without loss of generality.

Delegation fact 508 includes a principal #1 portion 502(1), delegation-directive verb 520, and a delegated fact portion 508(D). Delegated fact 508(D) includes a principal #2 portion 502(2), a verb phrase portion 516, a resource portion 804, and a $fact\ qualifier_{1 \ldots f}$ portion 806(1 . . . f). Hence, an example assertion format 800 may comport with a form of:

assertor says principal1 delegation-directive-verb "principal2 verb-phrase resource fact-qualfier$_{1 \ldots f}$" if $fact_1$, $fact_2$, $fact_n$, $constraint_{1 \ldots m}$.

Thus, in a described implementation, a program may include an application programming interface (API) for a delegation mechanism. The delegation mechanism is initiated by an assertor and enables a first principal to delegate a right to a second principal for the second principal to make at least one assertion. The delegation mechanism enables the delegation to be specifically controlled. For example, the delegation mechanism may enable a delegation to be controlled using any of factors 702-712.

For example, delegation mechanism 600 may enable an assertor to specify at least one attribute that a first principal is to possess for the first principal to be capable of delegating a right to make an assertion and/or to specify at least one attribute that a second principal is to possess for the second principal to be permitted to make an assertion. For instance, delegation authority assertion 614 may include a conditional fact 508(1) such as: principal1 possesses (attribute name, attribute value) or principal2 possesses (attribute name, attribute value).

As another example, delegation mechanism 600 may enable an assertor to specify that a first principal can only delegate a right to make an assertion if the first principal has a certain capability with respect to a particular resource and/or that a second principal is only permitted to make an assertion if the second principal has a certain capability with respect to a particular resource. For instance, delegation authority assertion 614 may include a conditional fact 508(1) such as: principal1 read resource_a or principal2 verb Foo.

As yet another example, delegation mechanism 600 may enable an assertor to specify at least one fact qualifier that restricts a manner in which the delegation or the right may be exercised. For instance, delegation authority assertion 614 may include a delegated fact 508(D) such as: "principal2 write resource_b [connectivity_mechanism]", with a constraint 512 such as: connectivity_mechanism=LAN.

Thus, in a described implementation, a general mechanism enables fine-grained controls to be expressed on delegated access rights. By way of example but not limitation, fine-grained control over delegated access rights can be expressed with respect to the following:

The resource(s) to which access is being delegated;
The right(s) that can be exercised on those resources;
The principal(s) to whom those rights are being delegated;

The ability of a delegatee to further delegate those, or a subset of those, access rights (e.g., via transitive chaining); and Environmental restrictions (e.g., timespan, location, etc.) on the exercise of the delegated access rights (e.g., via fact qualifiers).

A delegation mechanism as described herein is capable of expressing these delegation control factors using a uniform declarative representation that allows specification of both delegation policy and delegate rights. As illustrated in FIGS. 5 and 8 and as described above, the general form of security assertions is leveraged to create an example form for delegation authority assertions 614 that enables the expression of controlled delegation policies. The example format is repeated here for convenient reference:

assertor says principal1 delegation-directive-verb "principal2 verb-phrase resource fact-qualifer$_1$ ... $_f$" if fact$_1$, fact$_2$, fact$_n$, constraint$_{1 ... m}$.

In this form, the assertor is the authority who authorizes the delegation to be made; principal1 is the potential delegator who may make the delegation; and principal2 is the delegatee.

Some example delegation policies include:

(1) The right for B to delegate read access to the file Foo for 8 hours to any principal may be expressed as:

A says B can assert "x read Foo [t1,t2]" if (t2−t1)≦8 Hrs.

By controlling the values that the variable 'x' may bind to, the set of principals who may be delegatees may be restricted. For example, equality and inequality constraints may be applied to the variable 'x'.

(2) The right for a principal p to delegate rights it holds to a resource Foo to other principals may be expressed as:

A says p can assert "x v Foo" if p v Foo.

If B read|write Foo is true, then the above delegation policy implies A says B can assert "x read|write Foo".

Delegation policies, such as the examples above, are combined with asserted capabilities to create a full delegation. In the example scenario of FIG. 6, delegation granting assertion 616 is an asserted capability. Given the policy (1) above, if B also asserts "B says C read Foo [0800,1200]", then A would believe that C is allowed to read Foo during the indicated time span. Similarly, given policy (2) above and the two assertions, "A says B read Foo" and "B says C read Foo", A would believe that C is allowed to read Foo.

With regard to the transitive chaining of delegation rights, a mechanism is also described for controlling the ability for a delegatee to further delegate the access rights it has been granted. The following example set of assertions is presented to expand upon this concept:

(3) A says B can assert "x read Foo";
(4) B says C can assert "x read Foo"; and
(5) C says D read Foo.

The question is whether or not A believes that D is authorized to read Foo based on assertion (3), which only states that B has the right to delegate read access to Foo. But, in this example, B has in turn asserted (4) that C has the right to delegate read access to Foo.

If one allows uncontrolled chaining, then thru logical deductions based on these statements, the answer to the question is yes. This affirmative answer is because one can conclude "B says D read Foo" is valid by deduction using assertions (4) and (5). Based on that deduction and assertion (3), one can conclude that "A say D read Foo" is valid. If, on the other hand, one disallows logical chaining thru deduced facts, then the answer to the question is no. When chaining is not allowed, one could only reach conclusions thru direct combination of assertion (3) with either assertion (4) or assertion (5), but not thru both (4) and (5).

In a described implementation, an example chaining delegation mechanism enables precise control over this type of logical chaining by introducing a 'depth' indicator or parameter that modifies the delegation-directive verb (e.g., can assert). If one wishes to disallow logical chaining, then the depth indicator has a value of zero, and assertion (3) is rewritten as:

(3.1) A says B can assert$_0$ "x read Foo".

Alternatively, if one wanted to explicitly allow B to pass along the delegation to exactly one more principal, then assertions (3), (4), and (5) are rewritten with the depth indicator having a value of one as:

(3.2) A says B can assert$_1$ "x read Foo";
(4.2) B says C can assert$_0$ "x read Foo"; and
(5.2) C says D read Foo.

The depth indicator is set to a value of zero in assertion (4.2) to enforce that C is not allowed to pass along the access rights it has been delegated. If it were permitted to do so, the chain of logical deductions needed to establish an assertion that is valid with respect to assertion (3.2) would exceed the indicated allowed depth of 1. With this approach, to enable an unbounded ability to pass along delegated access rights to other principals, a depth indicator value of infinity may be used.

Thus, in an example implementation, the depth indicator may be set to zero, infinity, or any positive integer. An example corresponding syntax is, respectively: can assert$_0$, can assert$_\infty$, and can assert$_n$. This enables unbounded delegation (e.g., with the infinity) or bounded delegation with a precise setting to any desired transitive chaining depth (e.g., 0, 1, 2, ... ).

However, in another example implementation, the depth indicator may only be set to zero or infinity. This enables (i) the prevention of any delegation chaining (e.g., with the zero value) or (ii) unbounded delegation. In this alternative example implementation, bounded but non-zero chaining may be enabled with nested delegation-directive verbs, which is described in the following paragraph.

More specifically, using a "can assert" implementation, chained delegation may be implemented with nesting using an assertion comporting with a form of: A says B can assert$_0$ x can assert$_0$ y can assert$_0$ z possesses group name=g. The preceding example is an explicit 3-level delegation. The number of delegation-directed verbs or level of nesting establishes the chaining depth. To reduce the use of depth indicators, either no chaining or unbounded chaining may be considered the default transitive chaining rule when there is not explicit indication. Nesting may also be used with depth indicators of positive integer values. Other combinations or derivations may be implemented.

Figure 9:
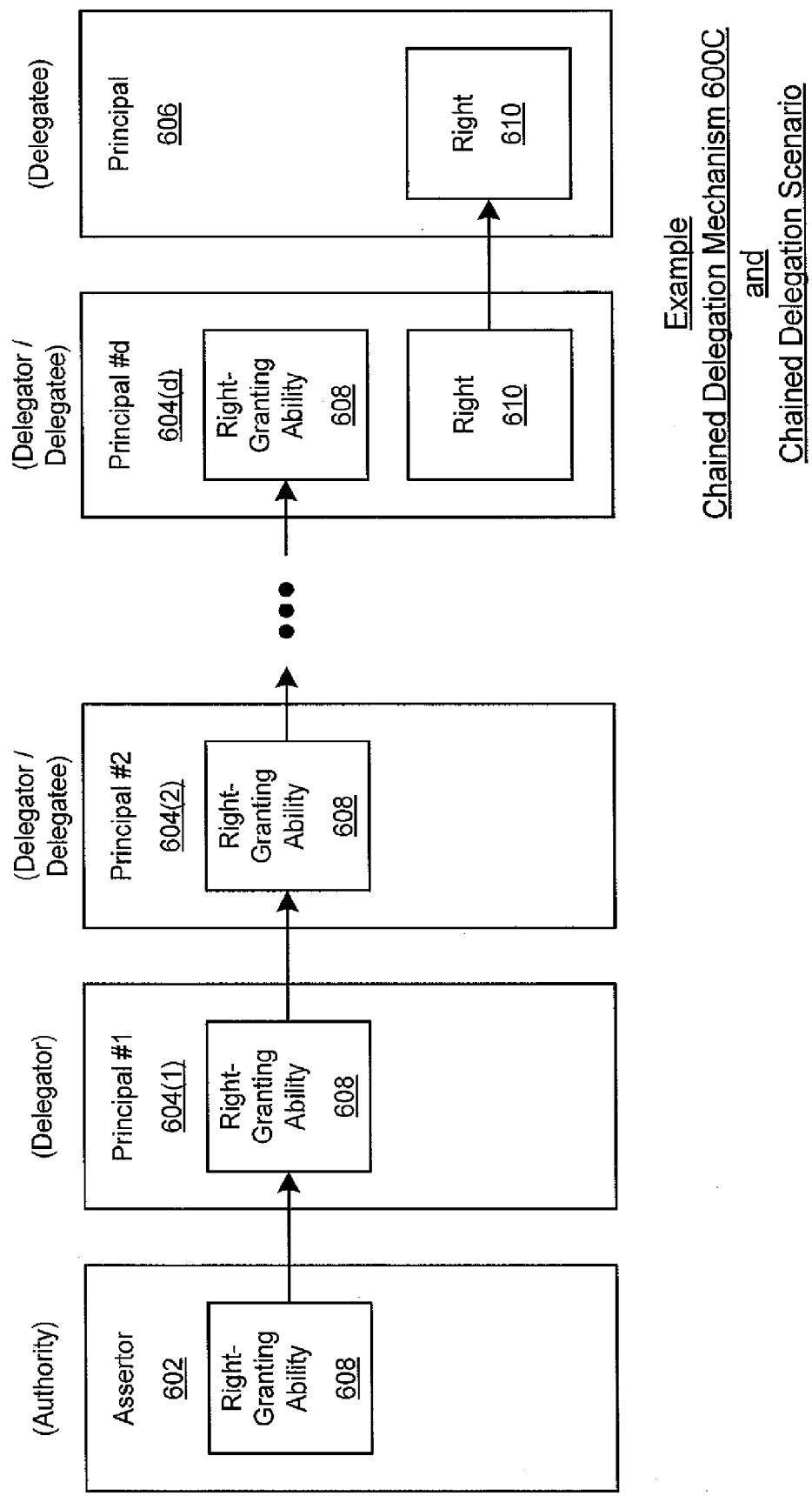
FIG. 9 is a block diagram illustrating an example chained delegation mechanism from a functional perspective along with an example chained delegation scenario.

FIG. 9 is a block diagram illustrating an example chained delegation mechanism 600C from a functional perspective along with an example chained delegation scenario. As illustrated, example chained delegation scenario includes assertor 602, principal #1 604(1), principal #2 604(2), ..., principal #d 604(d). The variable "d" is an integer corresponding to the chaining depth. The delegation scenario also includes principal 606, right-granting ability 608, and right 610.

In a described implementation, assertor 602 delegates right-granting ability 608 to principal #1 604(1). Principal #1 604(1) delegates right-granting ability 608 to principal #2 604(2). Principal #2 604(2) delegates right-granting ability 608 to principal #d 604(d), perhaps through other intermediate principals 604, as indicated by the ellipses. Principal #d 604(d) then grants right 610 to principal 606. Example general approaches to a security language implementation that enables chained delegation mechanism 600C are described herein above (e.g., the transitive chaining descriptions and examples above, as well as the general delegation authority assertion format 800). Example format approaches that are specific to a chained delegation mechanism are described below with reference to FIG. 10.

Figure 10:
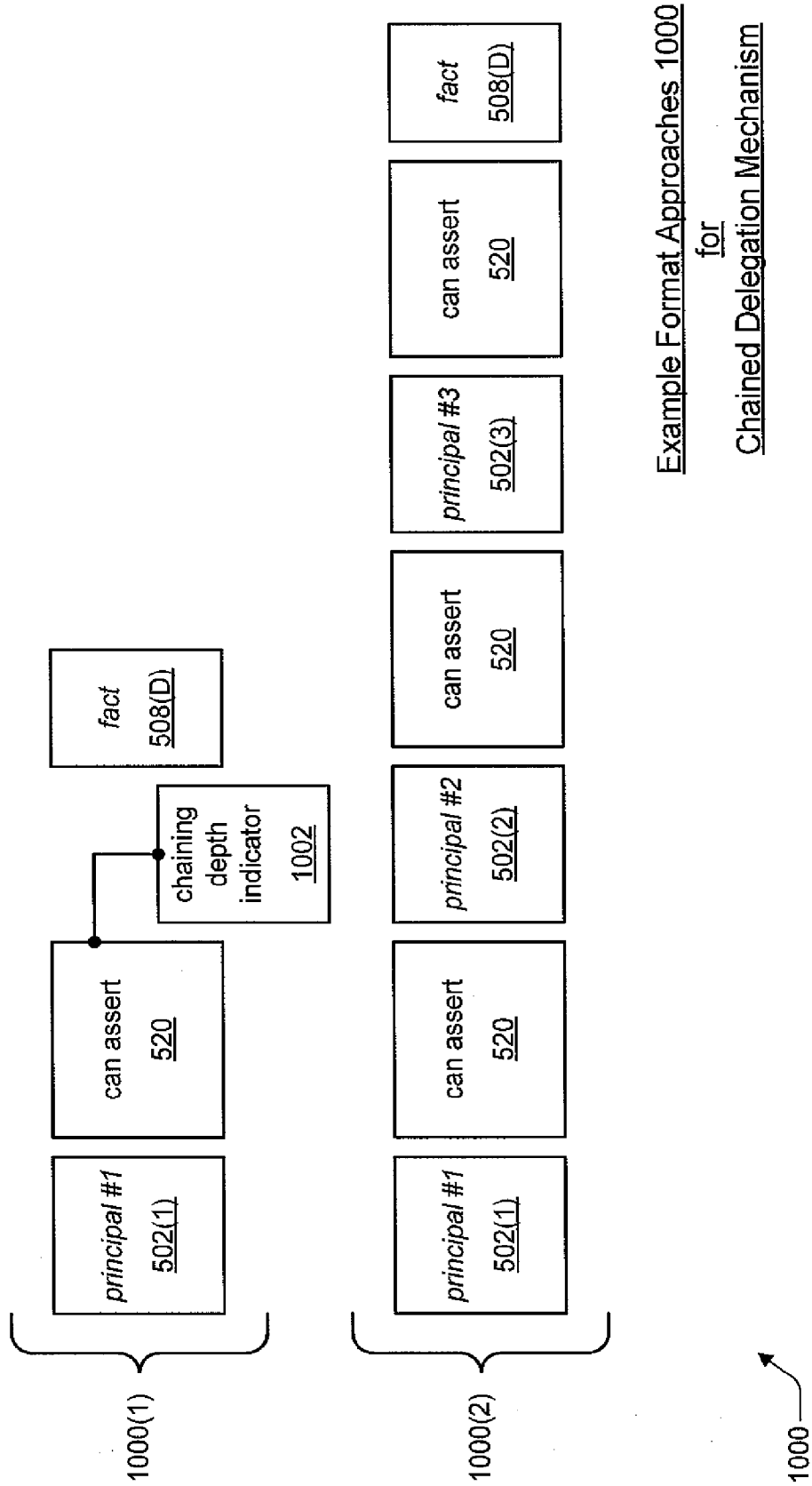
FIG. 10 is a block diagram illustrating two example format approaches for a chained delegation mechanism.

FIG. 10 is a block diagram illustrating two example format approaches 1000 for a chained delegation mechanism. Format 1000(1) illustrates a delegation format having a depth indicator, and format 1000(2) illustrates a delegation format utilizing nesting. By way of example only, the delegation-directive verb is realized using a "can assert" implementation in example format approaches 1000.

More specifically, format 1000(1) includes a principal #1 portion 502(1), a can assert portion 520, and a delegated fact portion 508(D). Format 1000(1) also includes a chaining depth indicator 1002. Chaining depth indicator 1002 is associated with can assert portion 520. Chaining depth indicator 1002 may take on any value to establish the allowed transitive chaining depth. Examples from above include zero, infinity, and positive integers.

Format 1000(2) includes a principal #1 portion 502(1), a can assert portion 520, a principal #2 portion 502(2), a can assert portion 520, a principal #3 portion 502(3), a can assert portion 520, and a delegated fact portion 508(D). Although not shown, each can assert portion 520 of format 1000(2) may also be associated with a chaining depth indicator 1002. For example, such a chaining depth indicator 1002 may be set to zero to indicate that each individual can assert portion 520 of format 1000(2) does not allow transitive chaining (e.g., beyond that permitted by the nesting).

Figure 11:
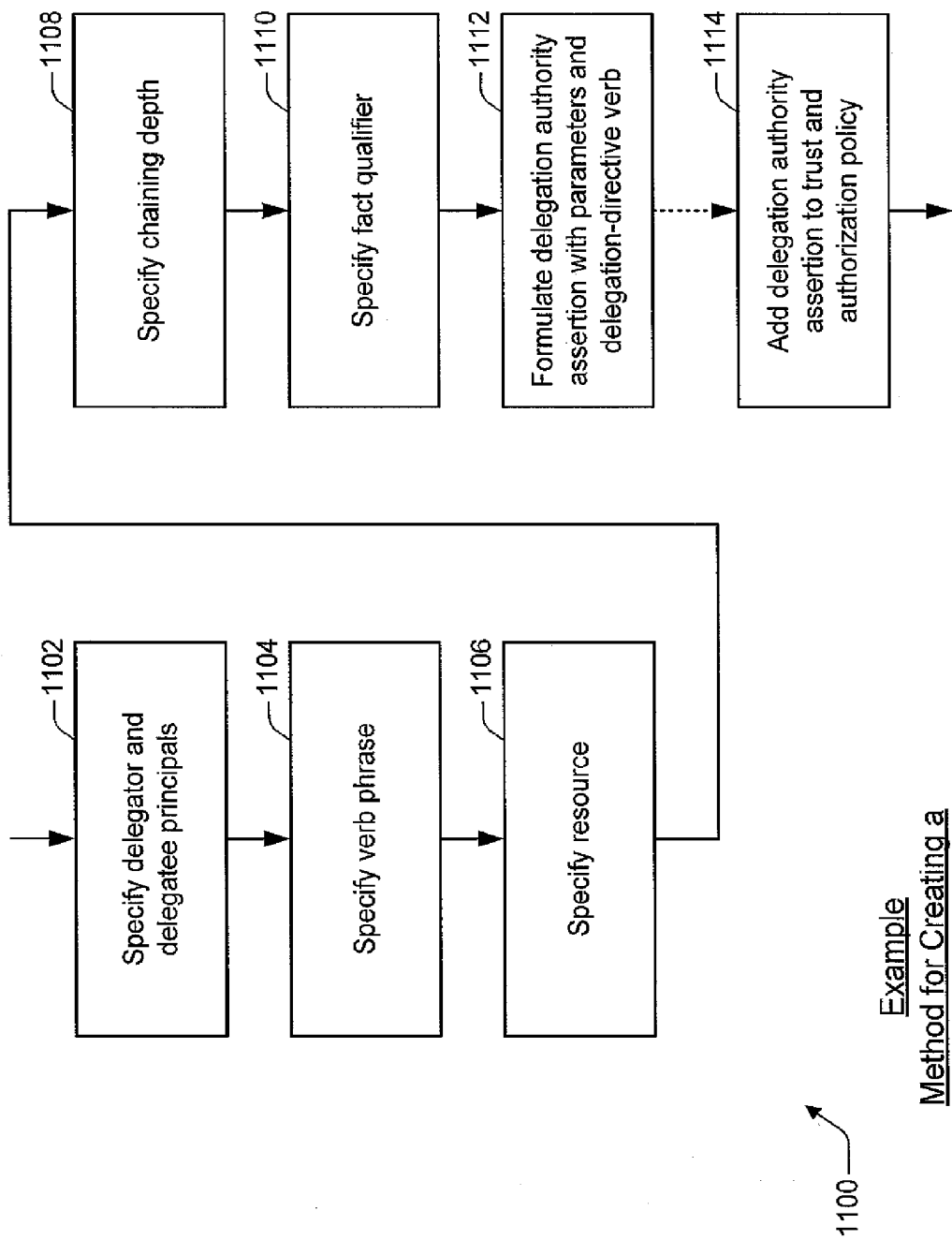
FIG. 11 is a flow diagram illustrating an example of a method for creating a delegation authority assertion.

FIG. 11 is a flow diagram 1100 illustrating an example of a method for creating a delegation authority assertion. Flow diagram 1100 includes seven (7) blocks 1102-1114. Although the actions of flow diagram 1100 may be performed in other environments and with a variety of hardware/software/firmware combinations, some of the features, components, and aspects of FIGS. 1-10 are used to illustrate an example of the method.

In a described implementation, at block 1102, a delegator principal and a delegatee principal are specified. For example, a principal #1 604 and a principal #2 606 may be identified with a principal factor 702 of a delegation mechanism 600.

At block 1104, a verb phrase is specified. For example, a certain verb phrase may be specified with a verb phrase factor 704. At block 1106, a resource is specified. For example, a particular resource 110 may be specified with resource factor 706. The verb phrase and resource may be combined to represent a right that may be granted from principal #1 604 to principal #2 606.

At block 1108, a chaining depth is specified. For example, in accordance with transitive chaining factor 712, a chaining depth may be specified by way of a chaining depth indicator 1002 (to comport with assertion format approach 1000(1)) and/or a nested expression of multiple delegation-directive verbs (to comport with assertion format approach 1000(2)).

At block 1110, a fact qualifier is specified. For example, at least one environmental restriction or other fact qualifier factor 708 may be indicated to be applied to any right with regard to the resource. Although not shown in FIG. 11, a given attribute with respect to one or both principals may also be specified (and incorporated into the delegation authority assertion of block 1112). For example, it may be specified that principal #1 604 and/or principal #2 606 must possess a given attribute for a delegation to be permitted with attributes factor 710.

At block 1112, a delegation authority assertion with the specified factors is formulated with a delegation-directive verb. For example, a delegation authority assertion 614 comporting with assertion format 800 and including a delegation-directive verb portion 520 may be formulated using any of the specified factors 702-712. For instance, a principal #1 portion 502(1), a principal #2 portion 502(2), a verb phrase portion 516, a resource portion 804, and fact qualifier$_{1 \ldots f}$ portion(s) 806(1 . . . f) may each be included as part of delegation authority assertion 614. Given attributes may be specified as needing to be possessed by an identified principal using one or more conditional facts$_{1 \ldots n}$ 508(1 . . . n).

At block 1114, the delegation authority assertion is added to a trust and authorization policy. For example, delegation authority assertion 614 may be added to a trust and authorization policy 222. Thereafter, a delegation granting assertion 616 and/or any other relevant assertions may be combined into an assertion context within authorization context 212.

In a described implementation, delegation granting assertion 616, for the delegation to be properly effected, also includes at least the particular resource, the certain verb phrase, and the delegatee principal specified in the corresponding delegated fact 508(D) (of FIG. 8) in delegation granting assertion 616. An authorization query from authorization query table 224 is then evaluated in conjunction with the assertion context in authorization engine 218 to determine an authorization decision with respect to the particular resource 110.

Four example delegation-related policy idioms are presented below. Each corresponds to an example delegation type 714 (of FIG. 7). Specifically, attribute-based delegation 714(1), constrained delegation 714(2), depth-bound delegation 714(3), and width-bound delegation 714(4) examples are presented.

Attribute-Based Delegation Type 714(1): Attribute-based (as opposed to identity-based) authorization enables collaboration between parties whose identities are initially unknown to each other. The authority to assert that a subject holds an attribute (such as being a student) may then be delegated to other parties, who in turn may be characterized by attributes rather than identity.

In the example below, students are entitled to a discount. The expiration date of the student attribute can be checked with a constraint. The authority over the student attribute is delegated to holders of the university attribute, and authority over the university attribute is delegated to a known principal, the Board of Education.

Admin says x is entitled to discount if
x is a student till date,
currentTime( )≦date
Admin says univ can assert$_\infty$ x is a student till date if
univ is a university
Admin says BoardOfEducation can assert$_\infty$ univ is a university Constrained Delegation Type 714(2): Delegators may wish to restrict the parameters of the delegated fact. This can be done with constraints. In the example below, an STS is given the right to issue tickets for accessing some resource for a specified validity period of no longer than eight hours.

Admin says STS can assert$_\infty$ x has access from t1 till t2 if
t2−t1≦8 hours The delegation depth specified in the assertion above is unlimited, so STS can in turn delegate the same right to some STS2. With STS's assertion below, Admin accepts tickets issued by STS2 with a validity period of at most eight hours, where the start date is not before Jan. 1, 2007.

STS says STS2 can assert$_0$ x has access from t1 till t2 if
t1≧Jan. 1, 2007

Depth-Bounded Delegation Type 714(3): In a described implementation, the delegation-depth subscript of the can assert keyword can only be 0 (no re-delegation) or ∞ (unlimited re-delegation). Nevertheless, such an example security language can express any fixed integer delegation depth by nesting can assert. In the following example, Alice delegates the authority over is a friend facts to Bob and allows Bob to re-delegate one level further.

Alice says Bob can assert$_0$ x is a friend
Alice says Bob can assert$_0$ x can assert$_0$ y is a friend Suppose Bob re-delegates to Charlie with the assertion "Bob says Charlie can assert$_\infty$ x is a friend". Now, "Alice says Eve is a friend" follows from "Charlie says Eve is a friend". Since Alice does not accept any longer delegation chains, Alice (in contrast to Bob) does not allow Charlie to re-delegate with Charlie says Doris can assert$_0$ x is a friend Furthermore, Charlie cannot circumvent the delegation depth restriction with the following trick either, because the restriction also applies to conditional facts.

Charlie says x is a friend if x is Doris' friend
Charlie says Doris can assert$_0$ x is Doris' friend Accordingly, if it is assumed that the only assertions by Alice and Bob that mention the verbphrase x is a friend are those listed above, it can be shown that the result of the query Alice says x is a friend depends only of Charlie's assertions—not those of Doris for instance.

Width-Bounded Delegation Type 714(4): Suppose Alice wants to delegate authority over is a friend facts to Bob. She does not care about the length of the delegation chain, but she requires every delegator in the chain to satisfy some property, e.g. to possess an email address from fabrikam.com. The following assertions implement this policy by encoding controlled transitive delegation using the can assert keyword with a 0 subscript. Principals with the is a delegator attribute are authorized by Alice to assert is a friend facts, and to transitively re-delegate this attribute, but only amongst principals with a matching email address.

Alice says x can assert$_0$ y is a friend if
x is a delegator
Alice says Bob is a delegator
Alice says x can assert$_0$ y is a delegator if
x is a delegator,
y possesses Email email,
email matches *@ fabrikam.com The devices, actions, aspects, features, functions, procedures, modules, data structures, protocols, components, etc. of FIGS. 1-11 are illustrated in diagrams that are divided into multiple blocks. However, the order, interconnections, interrelationships, layout, etc. in which FIGS. 1-11 are described and/or shown are not intended to be construed as a limitation, and any number of the blocks can be modified, combined, rearranged, augmented, omitted, etc. in any manner to implement one or more systems, methods, devices, procedures, media, apparatuses, APIs, protocols, arrangements, etc. for controlling the delegation of rights.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method for implementing a security policy assertion language (SecPAL) on a computing device, the method comprising:
   specifying, by the computing device, a resource that is to be a target for a delegation;
   specifying a delegator principal for transferring a right associated with the resource;
   specifying a delegatee principal for receiving the right;
   specifying a verb phrase to represent the right; and
   formulating by the computing device a delegation authority assertion using the SecPAL to delegate the right from the delegator principal to the delegatee principal, wherein the delegation authority assertion is an English-language sentence in a form of:
      assertor says principal1 delegation-directive-verb "principal2 verb-phrase resource fact-qualifier$_{1 \ldots f}$" if fact$_1$, fact$_2$, . . . , fact$_n$, c$_{1 \ldots m}$,
   wherein at least one of the facts$_{1 \ldots n}$ includes an expression and the verb phrase, wherein the verb phrase comprises one of: a) a predicate portion and an expression portion, b) a can assert portion and a fact portion, or c) an alias portion and an expression portion, wherein "f", "m", and "n" are integers, and wherein "c" represents a constraint;
   combining the delegation authority assertion and a delegation granting assertion into an assertion context, wherein the delegation granting assertion includes the resource, the verb phrase, and the delegatee principal; and
   evaluating an authorization query in conjunction with the assertion context to determine an authorization decision for the resource.

2. The method as recited in claim 1, further comprising:
   adding the delegation authority assertion to a trust and authorization policy.

3. The method as recited in claim 1, further comprising:
   specifying a fact qualifier that indicates at least one environmental restriction on the right associated with the resource, wherein the delegation authority assertion is formulated with the fact qualifier.

4. The method as recited in claim 1, further comprising:
   specifying a delegation depth that indicates a permissible depth of delegation chaining, wherein the delegation authority assertion is formulated using the delegation depth.

5. The method as recited in claim 1, further comprising:
   storing the delegation authority assertion into at least one security token; and
   issuing the at least one security token to the delegatee principal, to enable the delegate principal to access the resource.

6. A device for implementing a security policy assertion language, the device comprising:
   a processor; and
   a memory coupled to the processor and storing computer-executable instructions which, when executed by the processor, direct the processor to perform acts comprising:
      receiving at least one security token that includes a delegation authority assertion to delegate a right associated with a resource from a first principal to a second principal, wherein the delegation authority assertion is an English-language sentence in a form of:
         assertor says principal1 delegation-directive-verb "principal2 verb-phrase resource fact-qualifier$_{1 \ldots f}$" if fact$_1$, fact$_2$, . . . , fact$_n$, c$_{1 \ldots m}$,
      wherein at least one of fact$_1$, fact$_2$, . . . , fact$_n$ includes an expression and a verb phrase, wherein the verb phrase comprises one of: a) a predicate portion and an expression portion, b) a can assert portion and a fact portion, or c) an alias portion and an expression portion, wherein "f", "n", and "m" are integers and wherein "c" represents one or more constraints; and combining the delegation authority assertion and a delegation granting assertion into an assertion context, the delegation granting assertion including the resource, the verb phrase, and the second principal; and evaluating an authorization query in conjunction with the assertion context to determine an authorization decision for the resource.

7. The device as recited in claim 6, wherein a control on the delegation includes an ability for the assertor to specify at least one attribute that the first principal is to possess for the first principal to be capable of delegating the right to make at least one assertion.

8. The device as recited in claim 6, wherein a control on the delegation includes an ability for the assertor to specify that the first principal is capable of delegating the right to make at least one assertion if the first principal has a certain capability with respect to a particular resource.

9. The device as recited in claim 6, wherein a control on the delegation includes an ability for the assertor to specify at least one attribute that the second principal is to possess for the second principal to be permitted to make at least one assertion.

10. The device as recited in claim 6, wherein a control on the delegation includes an ability for the assertor to specify that the second principal is permitted to make at least one assertion if the second principal has a certain capability with respect to a particular resource.

11. The device as recited in claim 6, wherein a control on the delegation includes an ability for the assertor to specify at least one fact qualifier that restricts a manner in which the delegation or the right is exercised.

12. The device as recited in claim 11, wherein the at least one fact qualifier comprises at least one environmental parameter selected from a group of environmental parameters comprising: a time restriction, a location restriction, a network connectivity mechanism restriction, and a revocation check frequency restriction.

13. The device as recited in claim 6, wherein a control on the delegation includes an ability for the assertor to specify a permitted transitive chaining depth.

14. The device as recited in claim 13, wherein the transitive chaining depth is controlled using a nested expression of multiple delegation-directive verbs.

15. The device as recited in claim 13, wherein the transitive chaining depth is controlled using a chaining depth indicator.

16. A system for implementing a security policy assertion language, the system comprising;

a processor; and a memory coupled to the processor and storing computer-executable instructions, which, when executed by the processor, direct the processor to perform acts comprising:

implementing, by the processor, a chained delegation mechanism to control a permitted transitive chaining depth for delegating rights to principals, wherein the control comprises a first delegation-directive verb that does not permit any transitive chaining and a second delegation-directive verb that permits unlimited transitive chaining, and wherein the control further comprises a number of the first delegation-directive verbs that are nested such that the number establishes a permitted transitive chaining depth that is non-zero and bounded;

implementing, by the processor, a delegation authority mechanism to specify a verb phrase to represent a right associated with a resource;

formulating, by the processor, a delegation authority assertion to delegate the right to at least one of the principals, wherein the delegation authority assertion is an English-language sentence in a form of:

assertor says principal1 delegation-directive-verb "principal2 verb-phrase resource fact-qualifier$_1$ $_{...f}$" if fact$_1$, fact$_2$, ..., fact$_n$, c$_1$ $_{...m}$;

wherein at least one of facts$_{1...n}$ includes an expression and the verb phrase, wherein the verb phrase comprises one of: a) a predicate portion and an expression portion, b) a can assert portion and a fact portion, or c) an alias portion and an expression portion, wherein "f", "m", and "n" are integers, and wherein "c" represents at least one constraint;

combining the delegation authority assertion and a delegation granting assertion into an assertion context, the delegation granting assertion including at least the resource, the verb phrase, and the principals;

delegating the right to at least one of the principals through the delegation authority assertion; and evaluating an authorization query in conjunction with the assertion context to determine an authorization decision for the resource.

17. The system as recited in claim 16, wherein the first delegation-directive verb comprises a delegation-directive verb that is associated with a chaining depth indicator that is assigned a zero value, and wherein the second delegation-directive verb comprises a delegation-directive verb that is associated with a chaining depth indicator that is assigned an infinite value.

18. The system as recited in claim 16, wherein enforcement of the permitted transitive chaining depth is propagated to conditional facts of an assertion that includes a delegation.

19. The system as recited in claim 16, wherein the first and second delegation-directive verbs comprise "can assert$_D$" or "can say$_D$", with "D" being set to zero (0) or infinity ($\infty$).

20. The system as recited in claim 16, wherein the control further comprises a delegation-directive verb that is associated with a chaining depth indicator that is a positive integer value.

* * * * *